(12) United States Patent
Sugiyama et al.

(10) Patent No.: US 8,891,667 B2
(45) Date of Patent: Nov. 18, 2014

(54) TRANSMISSION APPARATUS, TRANSMISSION METHOD AND METHOD OF ALTERING TRANSMISSION BAND

(71) Applicant: Fujitsu Limited, Kawasaki (JP)

(72) Inventors: Junichi Sugiyama, Oyama (JP); Makoto Shimizu, Oyama (JP); Wataru Odashima, Oyama (JP); Shota Shinohara, Kawasaki (JP); Hiroyuki Homma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/787,856

(22) Filed: Mar. 7, 2013

(65) Prior Publication Data

US 2013/0243114 A1 Sep. 19, 2013

(30) Foreign Application Priority Data

Mar. 16, 2012 (JP) ................................. 2012-061197

(51) Int. Cl.
*H04L 27/00* (2006.01)
*H04J 3/06* (2006.01)
*H04L 7/00* (2006.01)

(52) U.S. Cl.
CPC ............. *H04L 7/0016* (2013.01); *H04J 3/0691* (2013.01)

USPC ........... 375/295; 375/354; 375/371; 375/373; 375/375; 455/516; 370/516; 327/163

(58) Field of Classification Search
CPC .............................. H04L 7/0016; H04J 3/0691
USPC .......... 375/295, 354, 371, 373, 375; 455/516; 370/516; 327/163
See application file for complete search history.

(56) References Cited

U.S. PATENT DOCUMENTS 7,020,401 B2 * 3/2006 Sakano et al. ................. 398/175

FOREIGN PATENT DOCUMENTS

JP 2011-176750 9/2011

* cited by examiner

*Primary Examiner* — Leon Flores
(74) *Attorney, Agent, or Firm* — Fujitsu Patent Center

(57) ABSTRACT

A transmission apparatus for transmitting frames accommodating client data over a transmission network, comprising a clock generation unit that generates a clock for timing processing period of signal processing, a deviation detection unit that detects clock deviation between the clock generated by the clock generation unit and the clock used for timing processing period of signal processing by other transmission apparatus that receives the client data from outside the transmission network and adds them to frames, and a timing generation unit that generates timing signal of processing period of signal processing corrected with the clock deviation.

20 Claims, 24 Drawing Sheets

TRANSMISSION APPARATUS, TRANSMISSION METHOD AND METHOD OF ALTERING TRANSMISSION BAND

CROSS-REFERENCE TO RELATED APPLICATIONS

This application is based upon and claims the benefit of priority of the prior Japanese Patent Application No. 2012-061197, filed on Mar. 16, 2012, the entire contents of which are incorporated herein by reference.

FIELD

Embodiments described in the present specification relate to a transmission apparatus for transmitting client data over a transmission network.

BACKGROUND

A transmission apparatus for transmitting client data over a transmission network has been known. An example of such a transmission apparatus is an ADM (Add-Drop Multiplexer) apparatus for transmitting SONET/SDH (Synchronous Optical Network/Synchronous Digital Hierarchy) frames or OTN (Optical Transport Network) frames. The transmission apparatus has an internal clock and generates timings of various processing periods for signal processing such as frame periods based on an internal clock.

As a related technology, an apparatus for accommodating and multiplexing a client signal has been known which accommodates or multiplexes a client signal in an OTN frame, and separates the accommodated or multiplexed signal from the received OTM frame and outputs it as the client signal. The client signal accommodation and multiplexing apparatus includes an accommodating means for applying overhead to the client signal of 1.238 Gbit/s or less and accommodating the client signal into a digital frame through mapping. The client signal accommodation and multiplexing apparatus includes an arranging means for arranging a plurality of TSs (Tributary Slots) of 1.238 Gbit/s or less in an ODU0 (L) (Lower order ODU (Optical Channel Data Unit) 0) frame. The client signal accommodation and multiplexing apparatus includes a multiplexing means for accommodating or multiplexing the digital frame in or on the TS of the ODU0(L) frame through mapping.

Related art is disclosed in Japanese National Publication of International Patent Application No. 2011-176750.

SUMMARY

In accordance with an aspect of the apparatus, there is provided a transmission apparatus that transmits frames accommodating client data over a transmission network. The transmission apparatus includes a clock generation unit that generates a clock for timing the processing period of signal processing. The transmission apparatus also includes a deviation detection unit that detects the clock deviation between the clock generated by the clock generation unit and a clock used for timing of processing period in signal processing by other transmission apparatus which receives client data from outside the transmission network and adds it into frames. The transmission apparatus further includes a timing generation unit that generates a timing signal of the processing period for signal processing corrected with the clock deviation.

In accordance with another aspect of the apparatus, there is provided a transmission apparatus that transmits frames accommodating client data over a transmission network. The transmission apparatus includes a clock generation unit that generates a clock for timing the processing period of signal processing. The transmission apparatus also includes a deviation detection unit that detects the clock deviation between the clock generated by the clock generation unit and a clock used for timing of processing period in signal processing by another transmission apparatus which receives client data from outside the transmission network and adds it to frames. The transmission apparatus further includes a band alteration unit that alters the transmission band of client data at an alteration rate corrected in accordance with the clock deviation.

In accordance with an aspect of the method, there is provided a transmission method for transmitting client data accommodated in a frame over a transmission network. The transmission method includes generating a clock for timing the processing period of signal processing, and detecting clock deviation between this clock and a clock used for timing the processing period in signal processing by other transmission apparatus that receives client data from outside the transmission network and adds it to the frames. The transmission method further includes correcting the processing period of signal processing for transmitting client data with the clock deviation.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Clock deviation of the internal clock between transmission apparatuses may hamper high speed processing of client data transmission.

An example of high speed transmission processing that is hampered by the clock deviation is a resizing operation in which the transmission band is altered during transmission of client data. As one resizing operation, ODU Flex Hitless Resizing defined in ITU-T (International Telecommunication Union-Telecommunication sector) Recommendation G. 7044/Y. 1347 can be mentioned.

Resizing operation is performed by altering the transmission band stepwise at a certain alteration period. If there is a difference in the alteration period of altering the transmission band in resizing operation between transmission apparatuses due to the clock deviation of internal clock between apparatuses, a rate difference between the input rate and the output rate is produced in each transmission apparatus. When a rate of change of the transmission band is increased, the rate difference becomes broader and the buffer size to absorb the rate difference is increased. Increase in buffer size results in disadvantages such as an increase in the circuit size or increase in the delay in data transmission, and these disadvantages limit the increase of the alteration rate of transmission band and limits high speed resizing operation. It is the object of the apparatus and method disclosed herein to diminish the restriction on the faster process of transmission of client data due to the clock deviation.

1. First Embodiment 1.1. Exemplary System Construction

Figure 1:
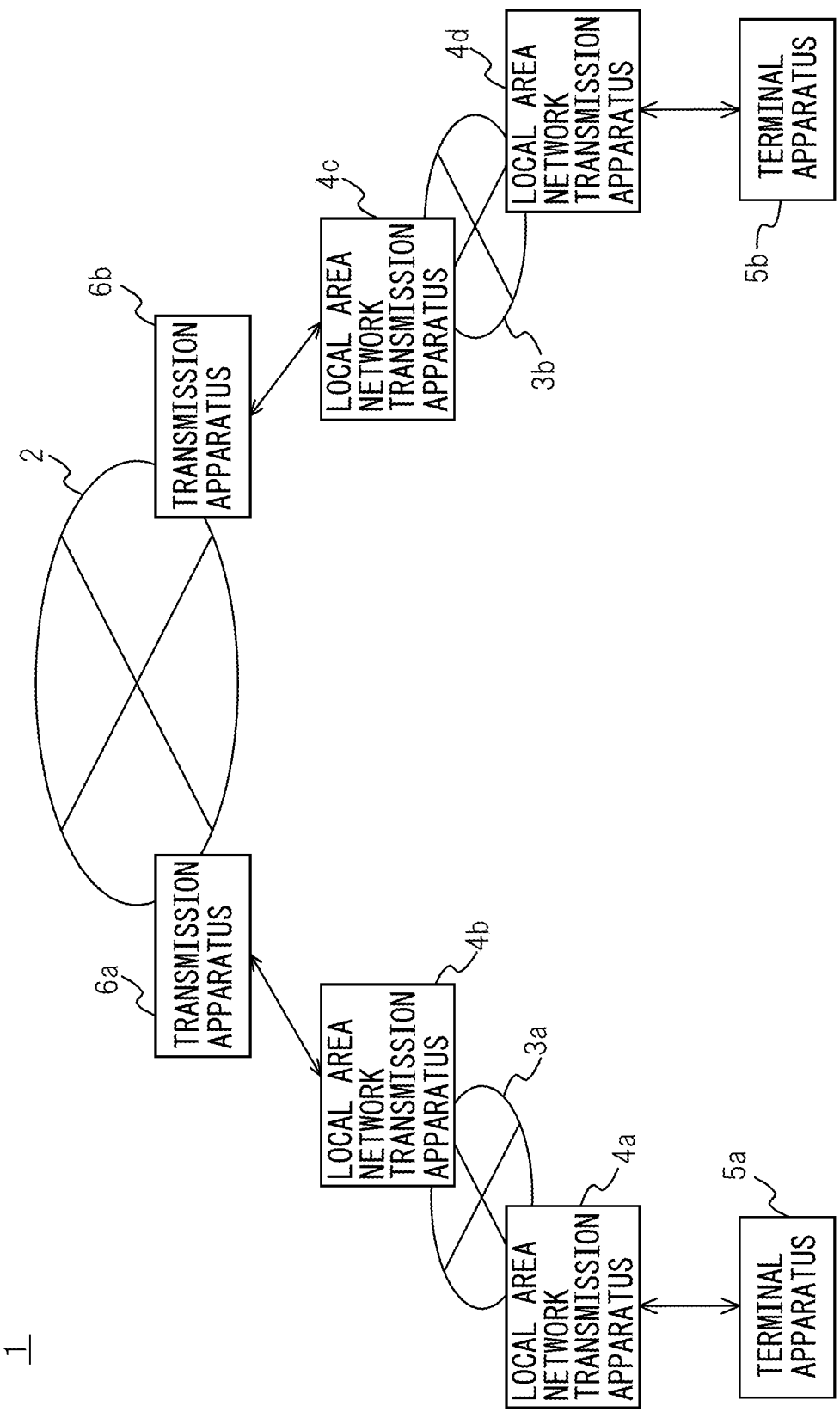
FIG. 1 is a view depicting an exemplary construction of a communication system.

Preferred exemplary embodiments will be described below with reference to appended drawings. FIG. 1 is a view depicting an exemplary construction of a communication system. A communication system 1 includes a transmission network 2, local area networks 3a and 3b, local area network transmission apparatuses 4a to 4d, terminal apparatuses 5a and 5b, and transmission apparatuses 6a and 6b. In the description that follows, the local area networks 3a and 3b may be collectively referred to as "local area network 3". The local area network transmission apparatuses 4a to 4d may be collectively referred to as "local area network transmission apparatus 4". The terminal apparatuses 5a and 5b may be collectively referred to as "terminal apparatus 5". The transmission apparatuses 6a and 6b may be collectively referred to as "transmission apparatus 6".

The transmission apparatus 6 inserts client data received from the terminal apparatus 5 via the local area network 3 and the local area network transmission apparatus 4 into a frame transmitted over the transmission network 2. Also, the transmission apparatus 6 extracts client data from the frame transmitted in the transmission network 2 and transmits it to the terminal apparatus 5 via the local area network 3 and the local area network transmission apparatus 4.

In an exemplary embodiment, the transmission apparatus 6 may be an ADM apparatus that transmits OTN frame flowing in the transmission network 2 that is an OTN network. The local area network transmission apparatus 4 may be a L2 switch or an aggregate switch transmitting a L2 frame flowing in the local area network 3 that is a L2 (Layer 2) network. The example cited above is not intended to suggest that use of the signal processing described in the present specification is limited to the communication system that transmits client data over OTN network or L2 network. The communication system 1 will be described below by exemplifying the frame transmitted over the transmission network 2 with an OTN frame. However, this example is not intended to suggest that application of the signal processing described in the present specification is limited to the transmission processing of OTN frame.

1.2. Exemplary Hardware Construction

Figure 2:
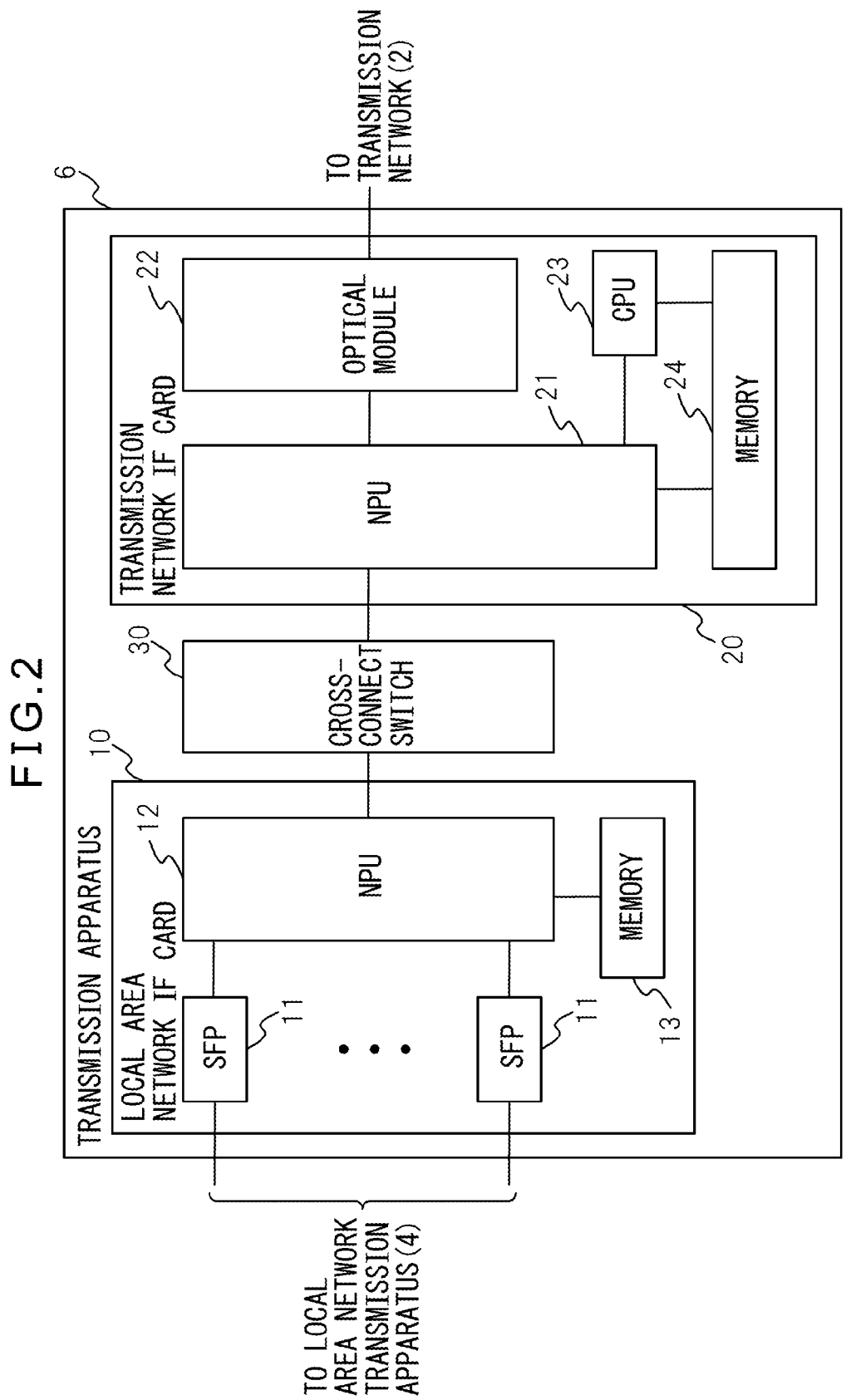
FIG. 2 is a view depicting an exemplary hardware construction of a transmission apparatus.

FIG. 2 is a view depicting an exemplary hardware construction of the transmission apparatus 6. The transmission apparatus 6 includes a local area network interface card 10, a transmission network interface card 20, and a cross-connect switch 30. In the appended drawings and description that follows, an interface may be denoted as "IF".

The local area network IF card 10 maps client data received via the local area network 3 from the terminal apparatus 5 and accommodated in a L2 frame into a ODU frame. Also, the local area network IF card 10 maps the ODU frame into an internal frame used for transfer within the transmission apparatus 6, and transmits it to the cross-connect switch 30. The local area network IF card 10 further demaps an internal frame received from the cross-connect switch 30 to acquire an ODU frame. The local area network IF card 10 further demaps an ODU frame to acquire a L2 frame, and transmits it to the terminal apparatus 5.

The local area network IF card 10 includes SFPs (small form-factor pluggable transceiver) 11, - - - , 11, a network processor unit 12, and a memory 13. In the appended drawings and description that follows, the network processor unit may be denoted as "NPU". The SFP 11 is a module that converts an optical signal transmitted in the local area network 3 into an electric signal. The NPU 12 executes mapping and demapping of frames in accordance with a program stored in the memory 13.

The transmission network IF card 20 demaps an internal frame received from the cross-connect switch 30 to acquire an ODU frame. Also, the transmission network IF card 20 multiplexes the ODU frame into an OTU frame and transmits it to the transmission network 2. The transmission network IF card 20 further separates an OTU frame received from the transmission network 2 into an ODU frame. The transmission network IF card 20 maps this ODU frame to an internal frame and transmits it to the cross-connect switch 30.

The transmission network IF card 20 includes a NPU 21, an optical module 22, a central processing unit 23, and a memory 24. In the appended drawings and the description that follows, the central processing unit may be denoted as "CPU". NPU 21 executes mapping and demapping of frames, multiplexing and separation processing of frames in accordance with a program stored in the memory 24. NPU 21 also executes resizing operation to be described later in accordance with a program stored in the memory 24. CPU 23 controls the entire operation of the transmission network IF card 20 in accordance with a program stored in the memory 24.

The cross-connect switch 30 performs routing operation of frames between the local area network IF card 10 and the transmission network IF card 20.

1.3. Exemplary Functional Construction

Figure 3:
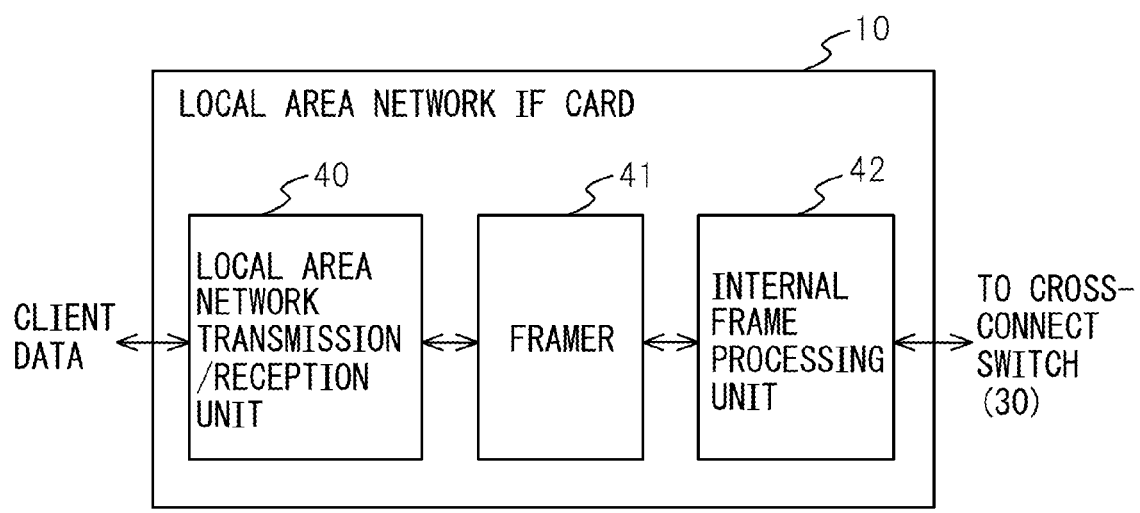
FIG. 3 is a view depicting an example of a functional block diagram of a local area network interface card.

Next, functions of various units of the transmission apparatus 6 will be described. FIG. 3 is an example of functional block diagram of the local area network IF card 10. FIG. 3 depicts mainly those functions which relate to the description that follows. Thus, the local area network IF card 10 may include constituents other than those depicted in the drawings. Functional block diagrams of various units of the transmission apparatus 6 depicted in FIG. 4, FIG. 6 to FIG. 9, FIG. 12 to FIG. 14, FIG. 17, FIG. 18 and FIG. 20 to FIG. 23, also depict mainly those functions which relate to the description that follows. Various units described in FIG. 4, FIG. 6 to FIG. 9, FIG. 12 to FIG. 14, FIG. 17, FIG. 18 and FIG. 20 to FIG. 23 may include constituents other than those depicted in the drawings.

The local area network IF card 10 includes a local area network frame transmission/reception unit 40, a framer 41, and an internal frame processing unit 42. The local area network frame transmission/reception unit 40 executes transmission and reception of L2 frames to and from the local area network 3. The framer 41 executes mapping of L2 frames to ODU frames, and demapping of ODU frames to L2 frames. The internal frame processing unit 42 executes mapping of ODU frames to internal frames and demapping of internal frames to ODU frames. The above described operations of the local area network frame transmission/reception unit 40, the framer 41 and the internal frame processing unit 42 are executed by NPU 12 depicted in FIG. 2.

Figure 4:
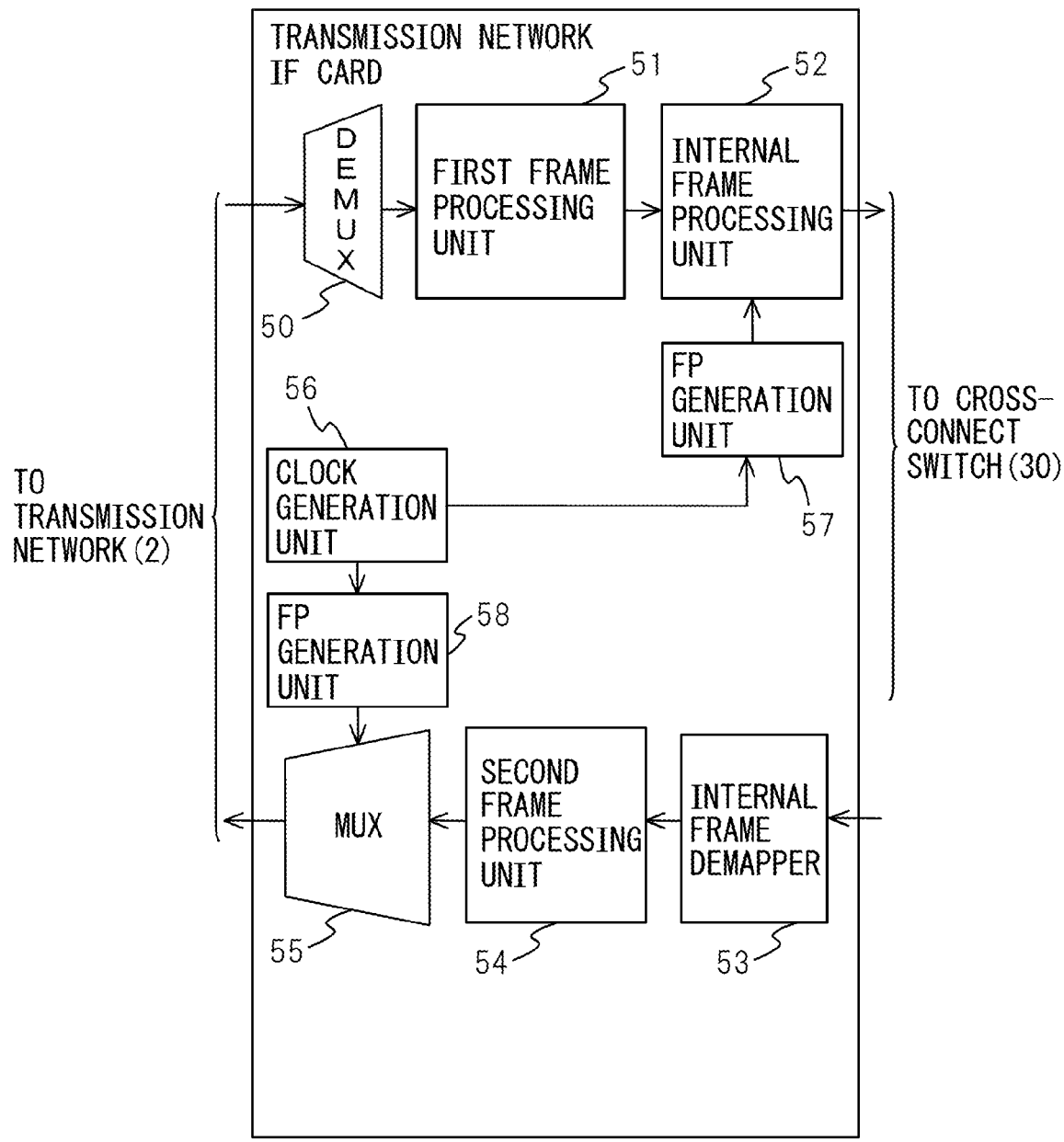
FIG. 4 is a view depicting an example of a functional block diagram of a transmission network interface card.

FIG. 4 is an example of functional block diagram of the transmission network IF card 20. The transmission network IF card 20 includes a demultiplexer 50, a first frame processing unit 51, an internal frame processing unit 52, an internal frame demapper 53, a second frame processing unit 54, and a multiplexer 55. Also, the transmission network IF card 20 includes a clock generation unit 56 and frame pulse generation units 57 and 58. Demultiplexer, multiplexer and frame pulse may be denoted as "DEMUX", "MUX" and "FP", respectively, in the appended drawings and the description that follows.

DEMUX 50 separates OTU frames received from the transmission network 2 into ODU frames. The internal frame processing unit 52 maps ODU frames to internal frames. The first frame processing unit 51 acquires the control information inserted in the header of an OPU (Optical channel Payload Unit) frame accommodated in an ODU frame, and outputs a control signal based on the control information to the internal frame processing unit 52. The first frame processing unit 51 also inserts the control information used in transmission of client data into the header of the OPU frame.

The internal frame demapper 53 demaps an internal frame received from the cross-connect switch 30 to acquire an ODU frame. MUX 55 multiplexes ODU frame into OTU frame and transmits it to the transmission network 2. The second frame processing unit 54 acquires the control information inserted in the header of an OPU frame, and outputs a control signal based on the control information to MUX 55. Also, the second frame processing unit 54 inserts the control information used in transmission of client data into the header of an OPU frame.

The clock generation unit 56 generates a clock for timing the processing period of signal processing executed by the transmission network IF card 20. The FP generation units 57 and 58 counts the clock generated by the clock generating unit 56, and generates FP as the timing pulse signal designating transmission timing for an internal frame and an OTU frame. Operations of the demultiplexer 50, the first frame processing unit 51, the internal frame processing unit 52, the internal frame demapper 53, the second frame processing unit 54, the multiplexer 55, and the FP generation units 57 and 58 are executed by NPU 21 depicted in FIG. 2.

Figure 5:
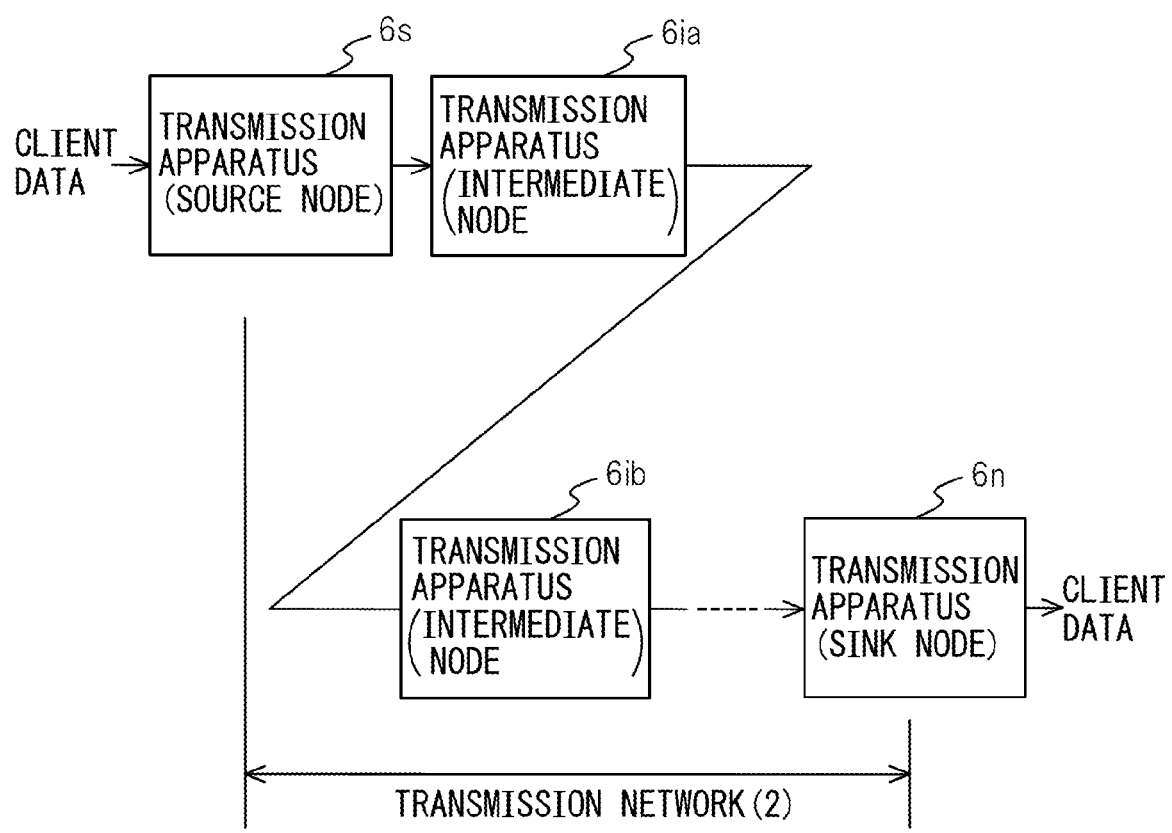
FIG. 5 is a schematic view depicting transmission apparatuses arranged on the transmission path of client data.

Next, operation of the transmission apparatus 6 in resizing operation will be described. FIG. 5 is a schematic view depicting the transmission apparatus 6 arranged on the transmission path of client data. Client data transmitted over the local area network 3 and by the local area network transmission apparatus 4 are mapped to an ODU frame by the transmission apparatus 6s and multiplexed to an OTU frame transmitted over the transmission network 2. The OTU frame accommodating the client data is relayed by the transmission apparatuses 6ia and 6ib over the transmission network 2, and arrives at the transmission apparatus 6n. The transmission apparatus 6n separates the received OTU frame into ODU frame, and client data are extracted from the ODU frame to be transmitted to the local area network 3.

In the description that follows, the transmission apparatuses 6s and 6n that receives and transmits client data from and to the local area network 3, respectively, may be denoted as "source node 6s" and "sink node 6n". Also, the transmission apparatuses 6ia and 6ib that relay the OTU frame accommodating client data on the transmission network 2 may be denoted as "intermediate node 6ia" and "intermediate node 6ib". The intermediate node 6ia is the transmission apparatus positioned at one stage before the intermediate node 6ib. The intermediate node 6ia and the intermediate node 6ib may be collectively denoted as "intermediate node 6i".

Figure 6:
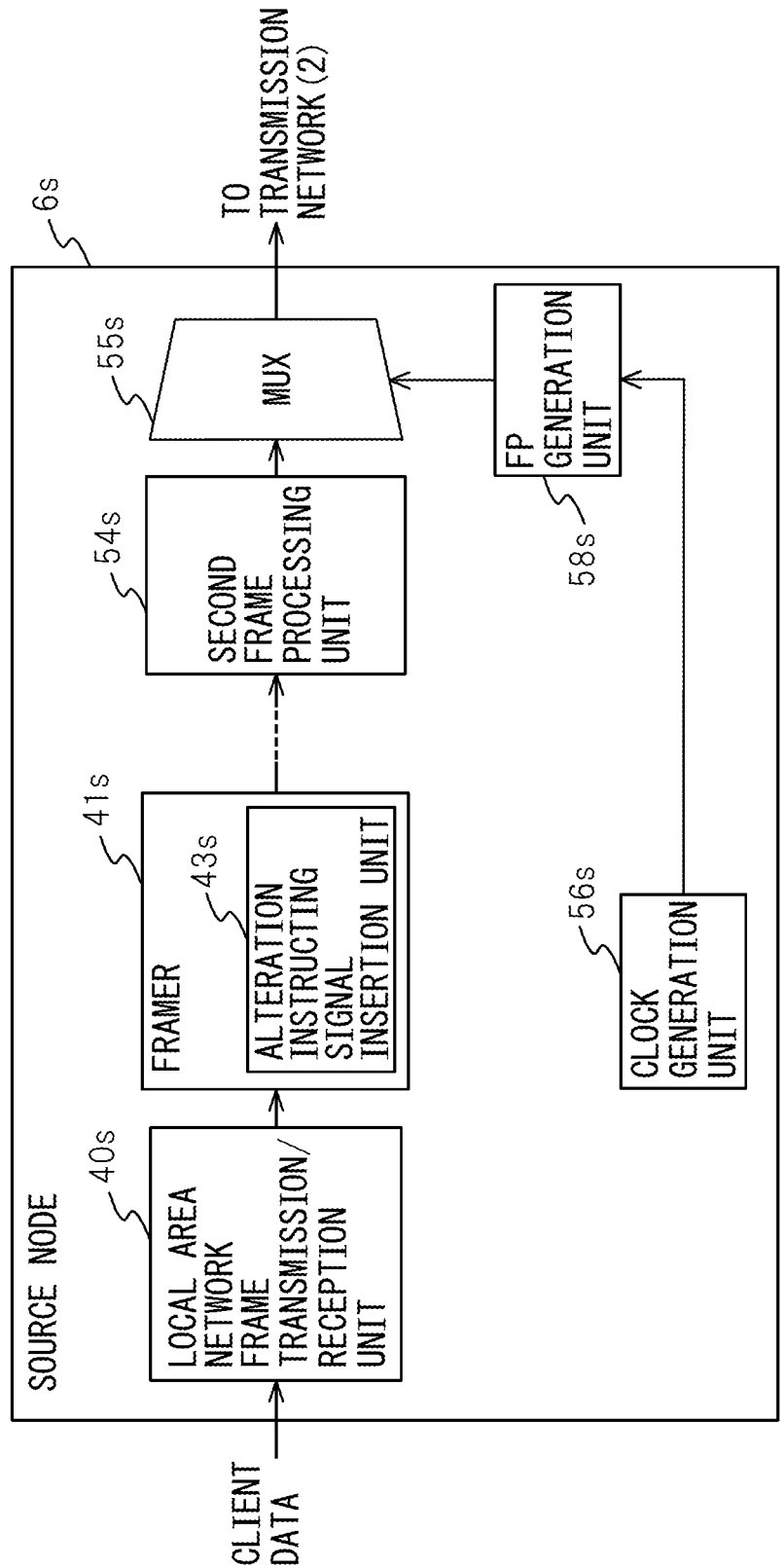
FIG. 6 is a view depicting an example of a functional block diagram of a source node.

FIG. 6 is a view depicting an example of functional block diagram of a source node 6s. The local area network frame transmission/reception unit 40s and the framer 41s respectively correspond to the local area network frame transmission/reception unit 40 and framer 41 of the local area network IF card 10 described with reference to FIG. 3. The second frame processing unit 54s, the multiplexer 55s, the clock generation unit 56s and FP generation unit 58s respectively correspond to the second frame processing unit 54, the multiplexer 55, the clock generation unit 56s, and FP generation unit 58 of the transmission network IF card 20 described with reference to FIG. 4.

The framer 41s includes an alteration instructing signal insertion unit 43s. The alteration instructing signal insertion unit 43s generates, when performing resizing operation, an alteration instructing signal for instructing resizing operation to other transmission apparatus. The alteration instructing signal may include information instructing the rate of alteration of transmission band at the time of resizing operation. The alteration instructing signal insertion unit 43s inserts it in the OPU header accommodating client data. The framer 41 multiplexes the OPU frame having this alteration instructing signal inserted therein to an ODU frame. In the description that follows, the rate of alteration of transmission band at the time of resizing may be denoted simply as "alteration rate".

Figure 7:
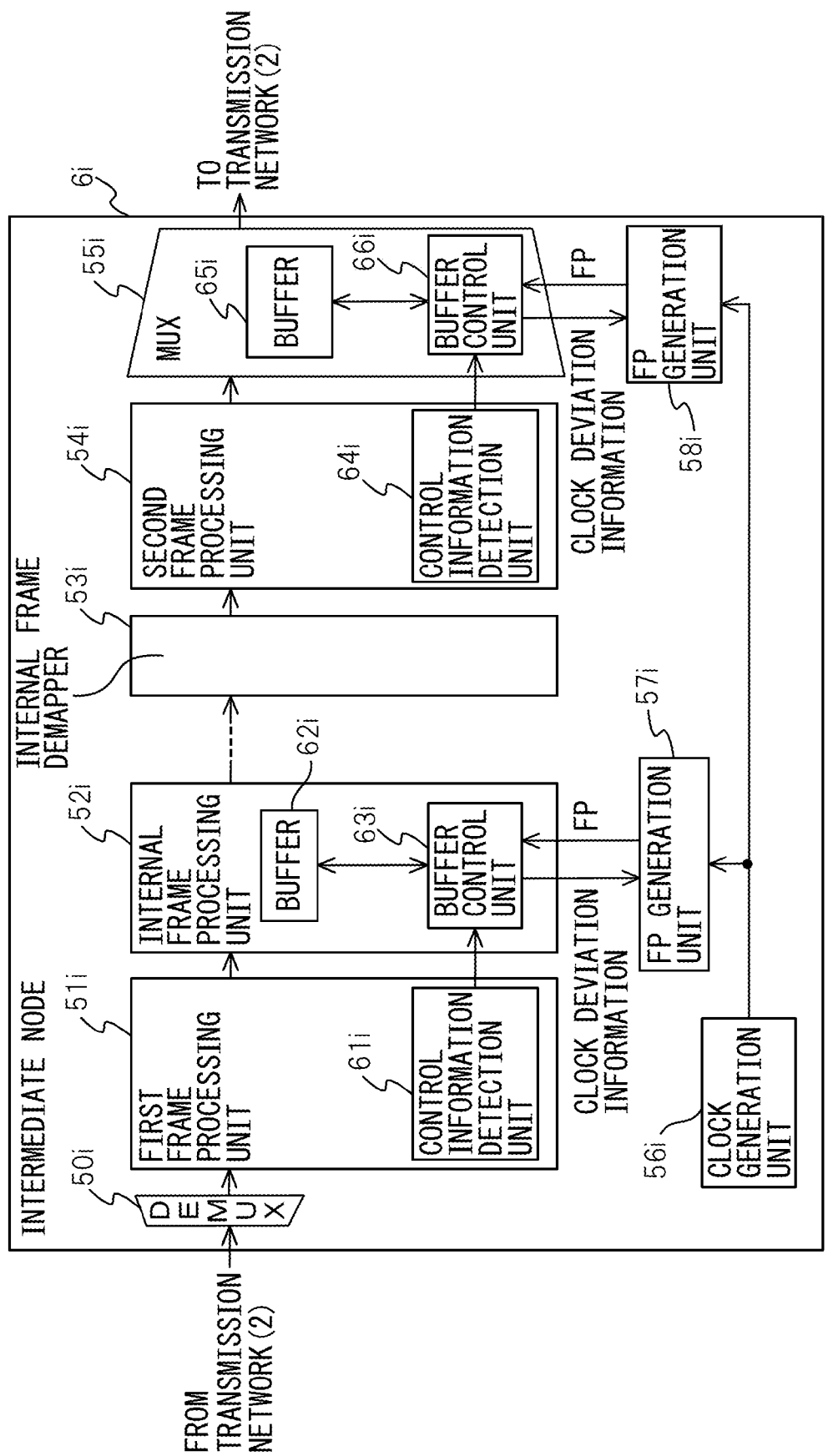
FIG. 7 is a view depicting a first example of a functional block diagram of an intermediate node.

FIG. 7 is a view depicting a first example of functional block diagram of the intermediate node 6i. DEMUX 50i, the first frame processing unit 51i and the internal frame processing unit 52i correspond respectively to DEMUX 50, the first frame processing unit 51 and the internal frame processing unit 52 of the transmission network IF card 20 described above with reference to FIG. 4. The internal frame demapper 53i, the second frame processing unit 54i and MUX 55i correspond respectively to the internal frame demapper 53, the second frame processing unit 54 and MUX 55 of the transmission network IF card 20. The clock generation unit 56i and FP generation units 57i and 58i correspond respectively to the clock generation unit 56 and FP generation units 57 and 58 of the transmission network IF card 20.

The first frame processing unit 51i includes a control information detection unit 61i. The internal frame processing unit 52i includes a buffer 62i and a buffer control unit 63i. Similarly, the second frame processing unit 54i includes a control information detection unit 64i. MUX 55i includes a buffer 65i and a buffer control unit 66i.

The control information detection unit 61i detects an alteration instructing signal from the OPU header accommodated in the ODU frame separated by DEMUX 50i, and determines whether or not resizing operation is to be executed. If resizing operation is to be executed, the control information detection unit 61i generates an alteration rate instructing signal and a mode signal. The alteration rate instructing signal is a signal instructing alteration rate. The mode signal is a signal indicating whether resizing operation is being executed or other operation is being executed. The control information detection unit 61i outputs an alteration instructing signal, an alteration rate instructing signal and a mode signal to the buffer control unit 63i.

The internal frame processing unit 52i stores a received ODU frame in the buffer 62i since reception of the ODU frame until mapping of this ODU frame to an internal frame. The buffer control unit 63i receives FP indicating the frame period of internal frame from the FP generation unit 57i. The buffer control unit 63i measures the amount of data written into the buffer 62i in every frame period, and read out data corresponding to the measured amount in every frame period. Thereafter, the read-out ODU frame is accommodated in internal frame.

The buffer control unit 63i calculates clock deviation $\Delta C$ between the clock of the clock generation unit 56i and the clock of the clock generation unit 56s of the source node 6s from the averaged value of effective data amount of client data received per pulse period of FP using equation (1) below.

$$\text{Clock deviation } \Delta C = (An-Av)/An \quad (1)$$

In equation (1), Av is an averaged value of effective data amount of client data received per pulse period of FP. An is the data amount of client data transmitted in the period equal to the nominal value of pulse period of FP at nominal transmission rate rn. The buffer control unit 63i outputs the clock deviation information to the FP generation unit 57i.

At the time of resizing, FP generation unit 577i corrects the pulse period Tf of the outputted FP with the clock deviation $\Delta C$ in accordance with following equation (2).

$$\text{Corrected pulse period } Tf' = 1/Fclk \times Ctr/(1+\Delta C) \quad (2)$$

In equation (2), frequency Fclk is the actual frequency of clock of the clock generation unit 56i. Ctr is the ratio of the nominal value of the pulse period Tf and the nominal value of the clock frequency of the clock generation unit 56i. For example, FP generation unit 57i corrects the pulse frequency Tf of FP by correcting the count of N-ary counter used in generation of FP from Ctr to (Ctr/(1+$\Delta C$)).

The pulse periods of FP of the source node 6s and the intermediate node 6i are denoted respectively as "Ts" and "Ti", and the deviations from the nominal value of the clock frequency of the source node 6s and the intermediate node 6i are denoted respectively as "dTs" and "dTi". Then, the input data rate rs of client data is nominal transmission rate×(1+dFs).

On the other hand, the pulse period of FP before correction is (nominal value Tn of pulse period Tf)/(1+dFi). Since dFs and dFi are small, the effective data amount Av of client data received during the pulse period Ti of FP before correction can be approximated by following equation (3)

$$Av = (\text{nominal transmission rate } rn) \times Tn \times (1 + dFs)/(1 + dFi) \approx \quad (3)$$
$$rn \times Tn \times (1 + dFs) \times (1 - dFi) \approx rn \times Tn \times (1 + dFi - dFs)$$

Since the data amount An transmitted at nominal transmission rate within the pulse period Tn is rn×Tn, the clock deviation $\Delta C = (An-Av)/An$ can be approximated by following equation (4).

$$\Delta C = (An - An \times (1 + dFs - dFi))/An \quad (4)$$
$$= dFs - dFi$$

Here, the pulse period Ts of the source node 6s is given by Ts=(nominal value Tn of the pulse period Tf)/(1+dFs). The pulse period Tf' corrected in accordance with the above equation (2) is given by following equation (5)

$$Tf' = Tn/(1 + dFi)/(1 + \Delta C) \quad (5)$$
$$= Tn/(1 + dFi)/(1 + dFi - dFs)$$
$$= Tn/(1 + dFs + dFi(dFi - dFs))$$

Since dFi(dFs−dFi) is small, the corrected pulse period Tf' is approximately equal to the pulse period Ts of the source node 6s, Ts=Tn/(1+dFs). That is, the pulse period of FP generated by FP generation unit 57i of the intermediate node 6i at the time of resizing is approximately equal to the pulse period generated by FP generation unit 58s of the source node 6s. As a result, periods of the source node 6s and the intermediate node 6i during resizing operation are approximately equal.

On the other hand, since alteration of transmission band during resizing operation is achieved by changing data amount accommodated in a frame, the transmission band during resizing operation is altered stepwise for each frame period. If frame periods of the source node 6s and the intermediate node 6i are different, alteration period of transmission band during resizing operation is different between these nodes, and rate difference between input and output rates in the intermediate node 6i varies.

Therefore, by correcting the frame period of the intermediate node 6i so as to be equalized to the frame period of the source node 6s, alteration period of transmission band can be coincide between the source node 6s and the intermediate node 6i. Variation of rate difference between input rate and output rate in the intermediate node 6i can be reduced by this coincidence of the alteration period of transmission band, and the size of the buffer for absorbing the rate difference can be reduced and data transmission delay can be reduced, too.

During resizing operation, the buffer control unit 63$i$ receives FP having corrected pulse period Tf'. The buffer control unit 63$i$ determines the step width of the variation of data amount read-out from the buffer 62$i$ per frame period in accordance with the alteration rate instructed by the alteration rate instructing signal and the nominal value of the frame period Tn. The buffer control unit 63$i$ changes the data amount read-out from the buffer 62$i$ in each frame period stepwise at the determined step width for each frame period determined by the corrected FP to thereby alter the transmission band of client data.

Similarly, the control information detection unit 64$i$ detects the alteration instructing signal from the OPU header accommodated in the ODU frame obtained by demapping the internal frame, and determines whether or not resizing operation is to be executed. If resizing operation is executed, the control information detection unit 64$i$ outputs the alteration rate instructing signal and the mode signal to the buffer control unit 66$i$.

MUX 55$i$ stores the received ODU frame in the buffer 65$i$ from reception of the ODU frame until the ODU frame is multiplexed on an OTU frame. The buffer control unit 66$i$ receives FP indicating the frame period of an OTU frame from the FP generation unit 58$i$. The buffer control unit 66$i$ measures the amount of data written into the buffer 65$i$ in each frame period, and reads out data corresponding to the measured data amount from the buffer 65$i$ in each frame period. Thereafter, the ODU frame read-out is accommodated in an OTU frame.

In the same manner as the buffer control unit 63$i$, the buffer control unit 66$i$ calculates clock deviation $\Delta C$ between the clock of the clock generation unit 56$i$ and the clock of the clock generation unit 56$s$ of the source node 6$s$. At the time of resizing, FP generation unit 58$i$ generates FP with corrected pulse period Tf', in the same manner as FP generation unit 57$i$.

During resizing, the buffer control unit 66$i$ receives FP with corrected pulse period Tf'. In the same manner as the buffer control unit 63$i$, the buffer control unit 66$i$ alters the transmission band of client data. FP with pulse period Tf' need not be FP but may be information indicating time between FP.

Figure 8:
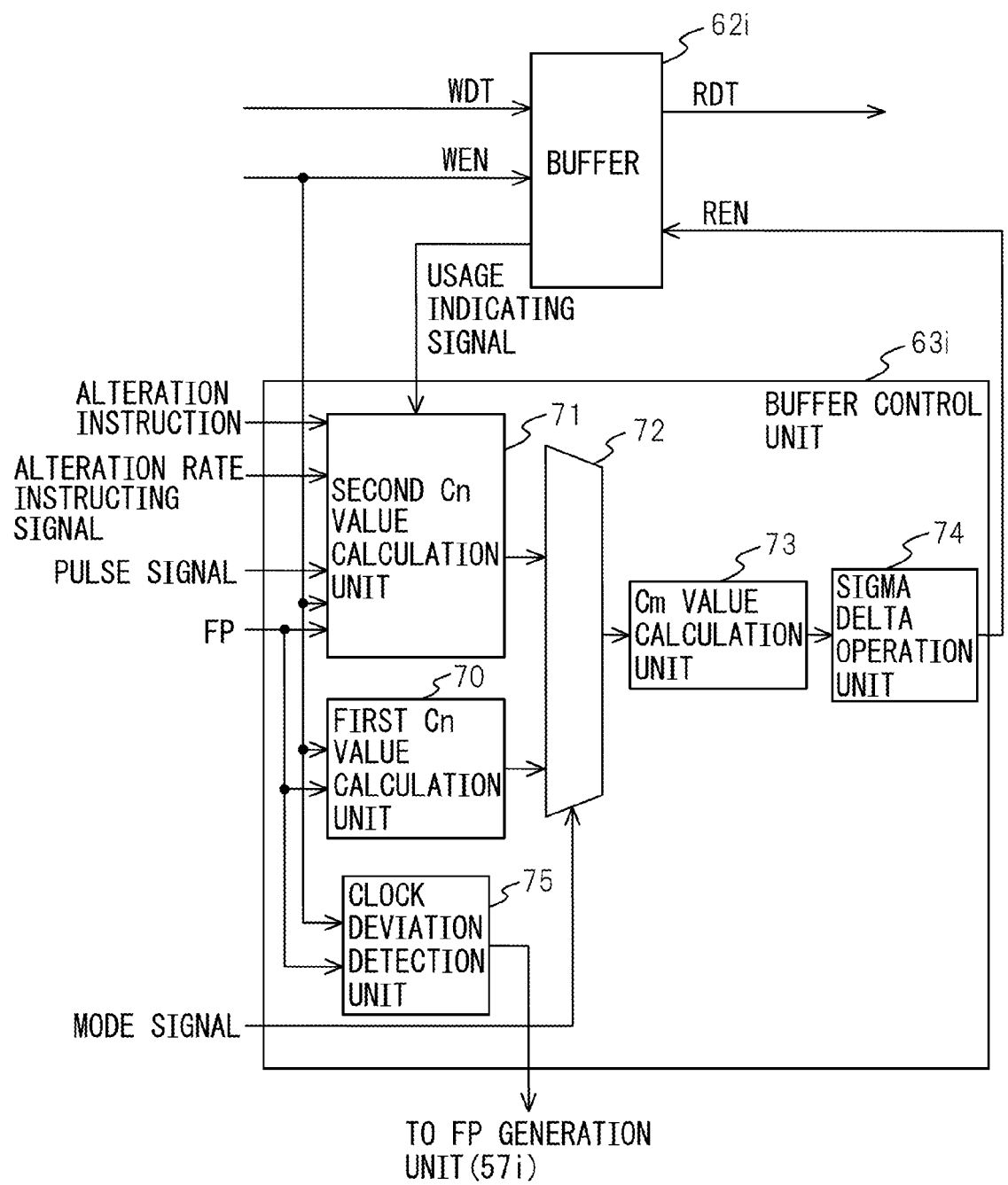
FIG. 8 is a view depicting a first example of a functional block diagram of a buffer control unit.

Next, function of the buffer control unit 63$i$ that realizes the above operation will be described in detail. FIG. 8 is a view depicting a first example of functional block diagram of the buffer control unit 63$i$ provided in the internal frame processing unit 52$i$. The buffer control unit 66$i$ in MUX 55$i$ may have same function as the buffer 63$i$. This also applies to other embodiments.

The buffer control unit 63$i$ includes a first Cn value calculation unit 70, a second Cn value calculation unit 71, a selector 72, a Cm value calculation unit 73, a sigma delta operation unit 74, and a clock deviation detection unit 75.

The first Cn value calculation unit 70 calculates Cn value that designates the amount of data to be read-out from the buffer 62$i$ in each frame period of the internal frame. The first Cn value calculation unit 70 inputs a write-enable signal WEN and FP for writing data WDT in the buffer 62$i$. In each frame period of internal frame indicated by FP, the first Cn value calculation unit 70 counts number of generated enable signal WEN during each frame period, and outputs the count as Cn value to the selector 72.

Figure 9:
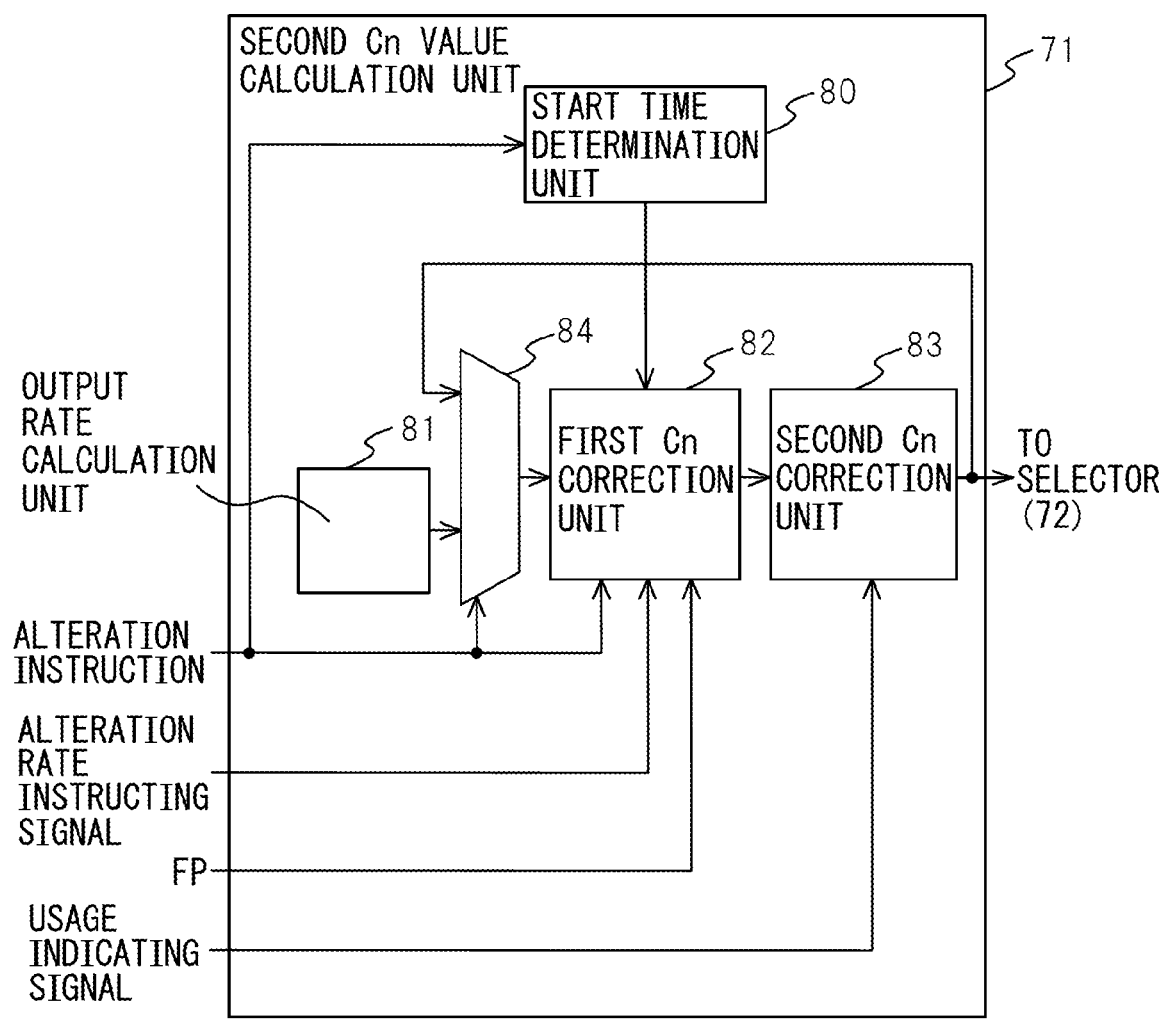
FIG. 9 is a view depicting a first example of a functional block diagram of a second Cn value calculation unit.

The second Cn value calculation unit 71 calculates Cn value used during resizing operation. FIG. 9 is a view depicting a first example of functional block diagram of the second Cn value calculation unit 71. The second Cn value calculation unit 71 includes a start time determination unit 80, an output rate calculation unit 81, a first Cn correction unit 82, a second Cn correction unit 83, and a selector 84.

The start time determination unit 80 determines the time when a prescribed time period has elapsed after the timing of reception of the alteration instructing signal from the control information detection unit 61$i$ as the start time for alteration of the transmission band. The start time determination unit 80 outputs the determined alteration start time to the first Cn correction unit 82. The output rate calculation unit 81 calculates Cn value corresponding to the nominal transmission rate rn before alteration of transmission band as the initial value of Cn value before alteration of transmission band. The output rate calculation unit 81 outputs the calculated Cn value to the selector 84. The selector 84 selects Cn value calculated by the output rate calculation unit 81 in the first frame period after starting the resizing operation, and outputs it to the first Cn correction unit 82.

The first Cn correction unit 82 inputs the alteration instructing signal, the alteration rate instructing signal and FP. The first Cn correction unit 82 determines the step width SW for changing Cn value stepwise at each frame period during resizing operation in accordance with the alteration rate instructed by the alteration rate instructing signal. When the alteration start time determined by the start time determination unit 80 has come, the first Cn correction unit 82 corrects Cn value outputted from the selector 84 in the determined step width SW, and outputs it to the second Cn correction unit 83.

The second Cn correction unit 83 inputs a usage indication signal indicating the usage of the buffer 62$i$. The second Cn correction unit 83 corrects Cn value based on the usage of the buffer 62$i$ so as to keep constant usage of the buffer 62$i$. For example, the second Cn correction unit 83 corrects the correction value inputted from the first Cn correction unit 82 in accordance with following equation (6). The second Cn correction unit 83 outputs the corrected Cn value to the selectors 72 and 84.

$$\text{Corrected } Cn \text{ value} = \text{inputted } Cn \text{ value} + \text{usage} \times \beta \qquad (6)$$

In subsequent frame periods, the selector 84 select Cn value outputted from the second Cn correction unit 83, and outputs it again to the first Cn correction unit 82. As a result, Cn value outputted from the second Cn correction unit 83 is altered at each frame period stepwise with step width SW.

Referring to FIG. 8, the selector 72 receives the mode signal from the control information detection unit 61$i$, and while in resizing operation, selects Cn value calculated by the second Cn value calculation unit 71 and outputs it to the Cm value calculation unit 73. Except while in the resizing operation, the selector 72 selects Cn value calculated by the first Cn value calculation unit 70 and outputs it to Cm value calculation unit 73.

Cm value calculation unit 73 calculates Cm value that increases by one as Cn value increases by n in accordance with the data storage unit n in the internal frame. The sigma delta operation unit 74 performs sigma delta operation on Cm value and generates read-out enable signal REN for reading out data RDT from the buffer 62$i$. The clock deviation detection unit 75 inputs FP and WEN during a period except while in resizing operation, and detects the clock deviation $\Delta C$ of equation (1) above based on the average value of effective data amount of client data received during a pulse period before correction. The clock deviation detection unit 75 outputs the clock deviation $\Delta C$ to FP generation unit 57$i$.

1.4. Resizing Operation

Figure 10:
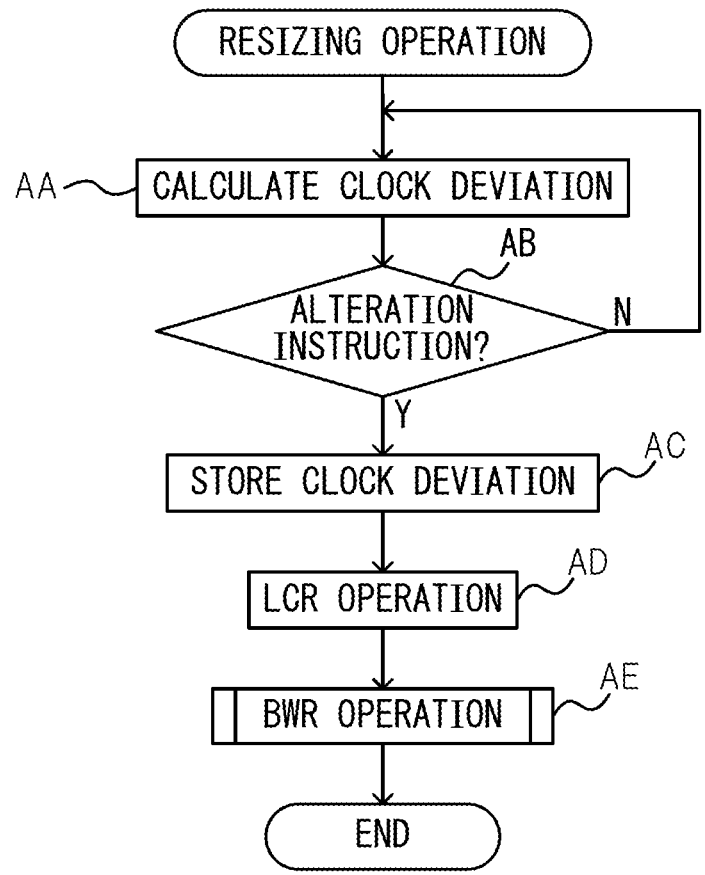
FIG. 10 is a view for illustrating the resizing operation in a transmission apparatus.

Next, resizing operation in the intermediate node 6$i$ will be described with reference to FIG. 10. In the present specification, transmission band alteration in the internal frame processing unit 52*i* during resizing operation is taken as an example. Frequency band alteration is performed in similar operation in MUX 55*i*, too. Same applies to the operation described with reference to FIG. 11, FIG. 15, FIG. 19 and FIG. 24.

A series of operations described with reference to FIG. 10 may be construed as a method including a plurality of steps. In this case, "operation" may be replaced by "step". The same applies to the operation described with reference to FIG. 11, FIG. 15, FIG. 19 and FIG. 24.

In operation AA, the clock deviation detection unit 75 calculates, during a period except while in the resizing operation, the clock deviation $\Delta C$ between the clock of the clock generation unit 56*s* of the source node 6*s*. In operation AB, the control information detection unit 61*i* determines whether or not an alteration instructing signal has been detected from an OPU header. The alteration instructing signal is inserted into an OPU header by the alteration instructing signal insertion unit 43*s* of the source node 6*s*. If the control information detection unit 61*i* has detected an alteration instructing signal (operation AB: Y), the processing proceeds to operation AC. If the control information detection unit 61*i* has not detected an alteration instructing signal (operation AB: N), the processing returns to operation AA.

In operation AC, FP generation unit 57*i* stores the clock deviation $\Delta C$. In operation AD, the internal frame processing unit 52*i* executes LCR (Link Connection Resize) operation for changing the number of tributary slots storing client data to be resized. In operation AE, the buffer control unit 63*i* executes BWR (Band Width Resize) operation for changing transmission band of client data.

Figure 11:
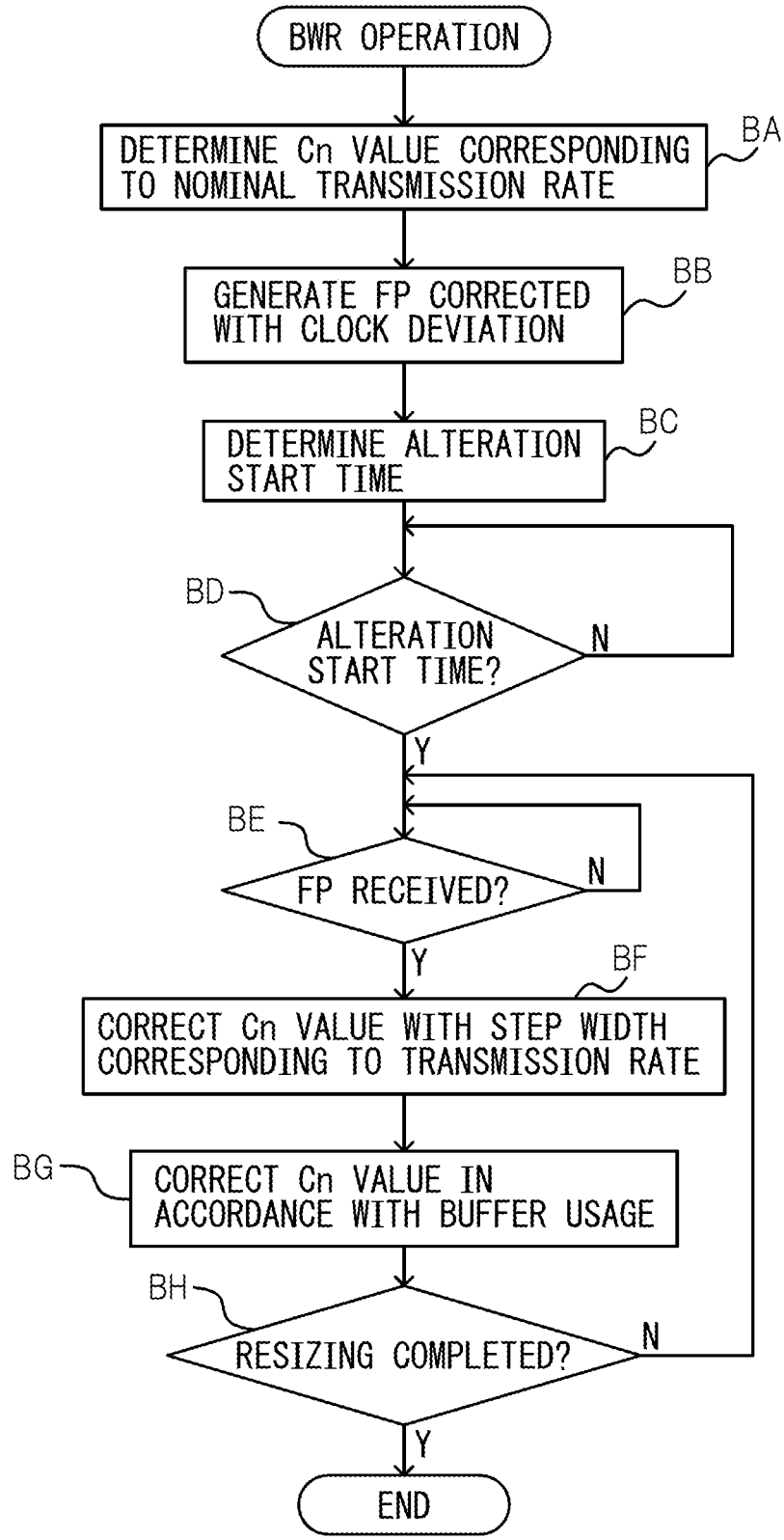
FIG. 11 is a view for illustrating a first example of the transmission band resizing operation.

FIG. 11 is a view for illustrating a first example of BWR operation. In operation BA, the output rate calculation unit 81 determines Cn value corresponding to nominal transmission rate rn before changing transmission band as the initial value of Cn before changing transmission band. In operation BB, FP generating unit 57*i* generates FP with the pulse period corrected with the clock deviation $\Delta C$, and supplies it to the internal frame processing unit 52*i*. In this way, the frame period of internal frame during resizing operation becomes equal to the pulse period of the corrected FP.

In operation BC, the start time determination unit 80 determines the alteration start time for altering transmission band. In operation BD, the first Cn correction unit 82 stands by until the alteration start time comes. If the alteration start time does not come (operation BD: N), the processing repeats operation BD. If the alteration start time has come (operation BD: Y), the processing proceeds to operation BE.

In operation BE, the first Cn correction unit 82 waits for FP pulse to be received. While FP pulse is not received (operation BE: N), the processing repeats operation BE. When FP pulse is received (operation BE: Y), the processing proceeds to operation BF.

In operation BF, the first Cn correction unit 82 corrects Cn value calculated by the output rate calculation unit 81 with the step width SW in accordance with the alteration rate instructed by the alteration rate instructing signal. In operation BG, the second Cn correction unit 83 corrects Cn value corrected by the first Cn correction unit 82 in accordance with the amount of usage of the buffer 62*i*. Client data are read out from the buffer 62*i* based on the read-out enable signal generated based on Cn value corrected by the second Cn correction unit 83.

In operation BH, the buffer control unit 63*i* determines whether or not the transmission band has reached the target value after alteration and resizing operation has been completed. If resizing operation has been completed (operation BH: Y), the processing is terminated. If resizing operation has not been completed (operation BH: N), the processing returns to operation BE. In operation loop BE to BH after the first time loop, the first Cn correction unit 82 corrects Cn value corrected by the second Cn correction unit 83 in the previous loop with the step width SW in accordance with the alteration rate instructed by the alteration rate instructing signal, and inputs it to the second Cn correction unit 83.

1.5. Effect of the Exemplary Embodiment

In accordance with the present exemplary embodiment, it is possible to correct alteration period for altering the transmission band of the intermediate node 6*i* during sizing operation so as to become approximately equal to the alteration period in the source node 6*s*. Therefore, the size of the buffer for absorbing the variation of the rate difference between input rate and output rate in the intermediate node 6*i* due to disparity of alteration period can be reduced.

Therefore, circuit size, power consumption and delay of data transmission in the intermediate node 6*i* due to retention time in the buffer can be reduced. Even if alteration rate is increased along with an increase in buffer size in order to speed-up resizing operation, the increase in buffer size can be suppressed by conserving of the buffer with the present exemplary embodiment. Thus, speed-up of processing time for resizing operation is facilitated.

2. Second Exemplary Embodiment

2.1. Exemplary Functional Construction

Next, another exemplary embodiment of the transmission apparatus 6 will be described. If there is clock deviation between the source node 6*s* and the intermediate node 6*i*, difference of alteration rate is produced due to difference of alteration period of transmission band at the time of resizing. As a result, rate difference between output rate of the source node 6*s* and output rate of the intermediate node 6*i* increases, and difference of input rate and output rate of the intermediate node 6*i* increases. This results in increase of the buffer size in order to absorb the difference of input rate and output rate.

Figure 12:
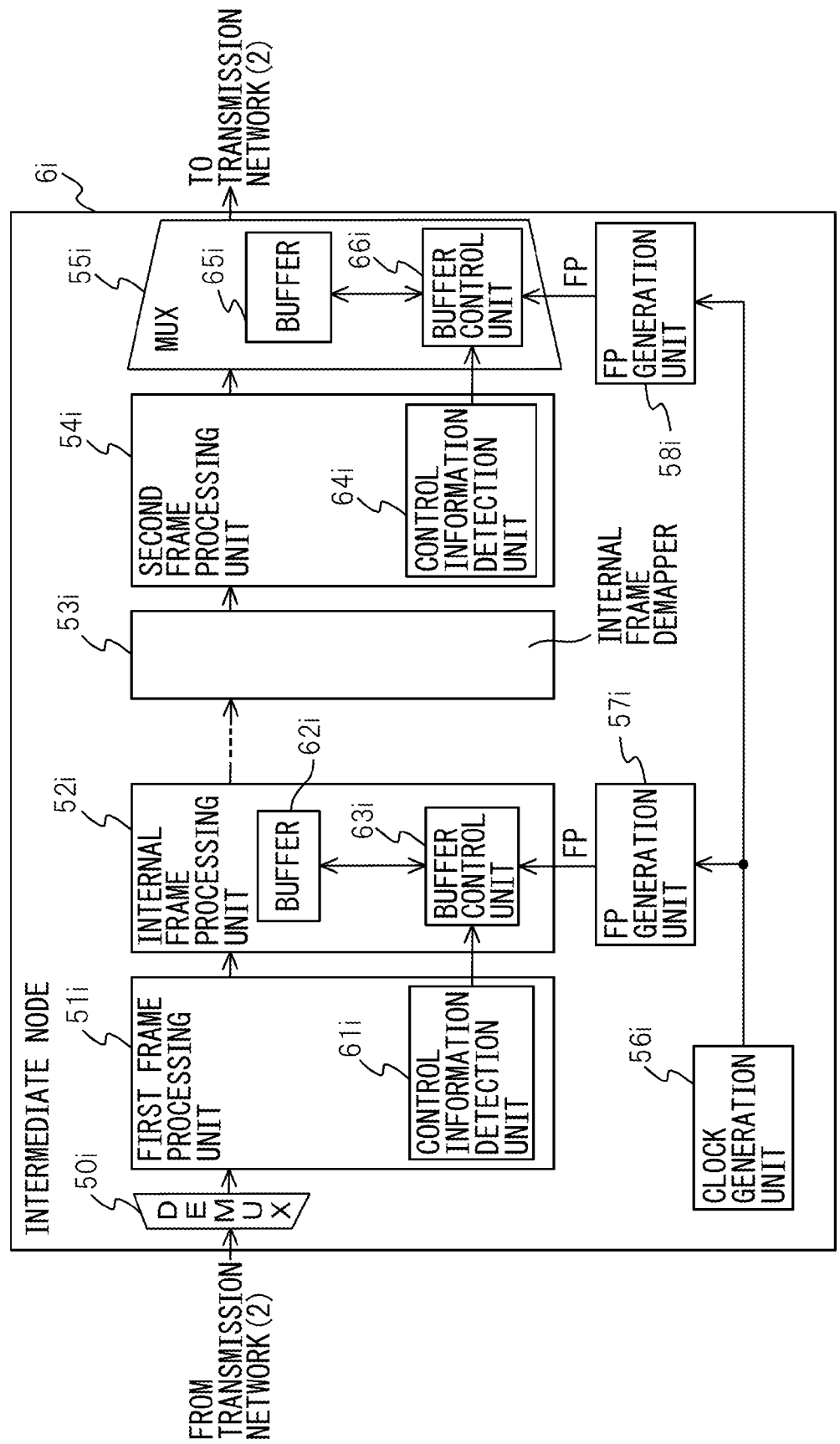
FIG. 12 is a view depicting a second example of a functional block diagram of the intermediate node.

In the present exemplary embodiment, in place of correction of frame period of the intermediate node 6*i* during resizing, Cn value that determines output rate of the intermediate node 6*i* is corrected in accordance with the clock deviation $\Delta C$. FIG. 12 is a view depicting a second example of functional block diagram of the intermediate node 6*i*. Same constituents as the constituents depicted in FIG. 7 are denoted by same reference numerals or symbols as in FIG. 7, and description of same function is omitted. In the present exemplary embodiment, output of the clock deviation $\Delta C$ from the buffer control units 63*i* and 66*i* to FP generation units 57*i* and 58*i* is omitted.

Figure 13:
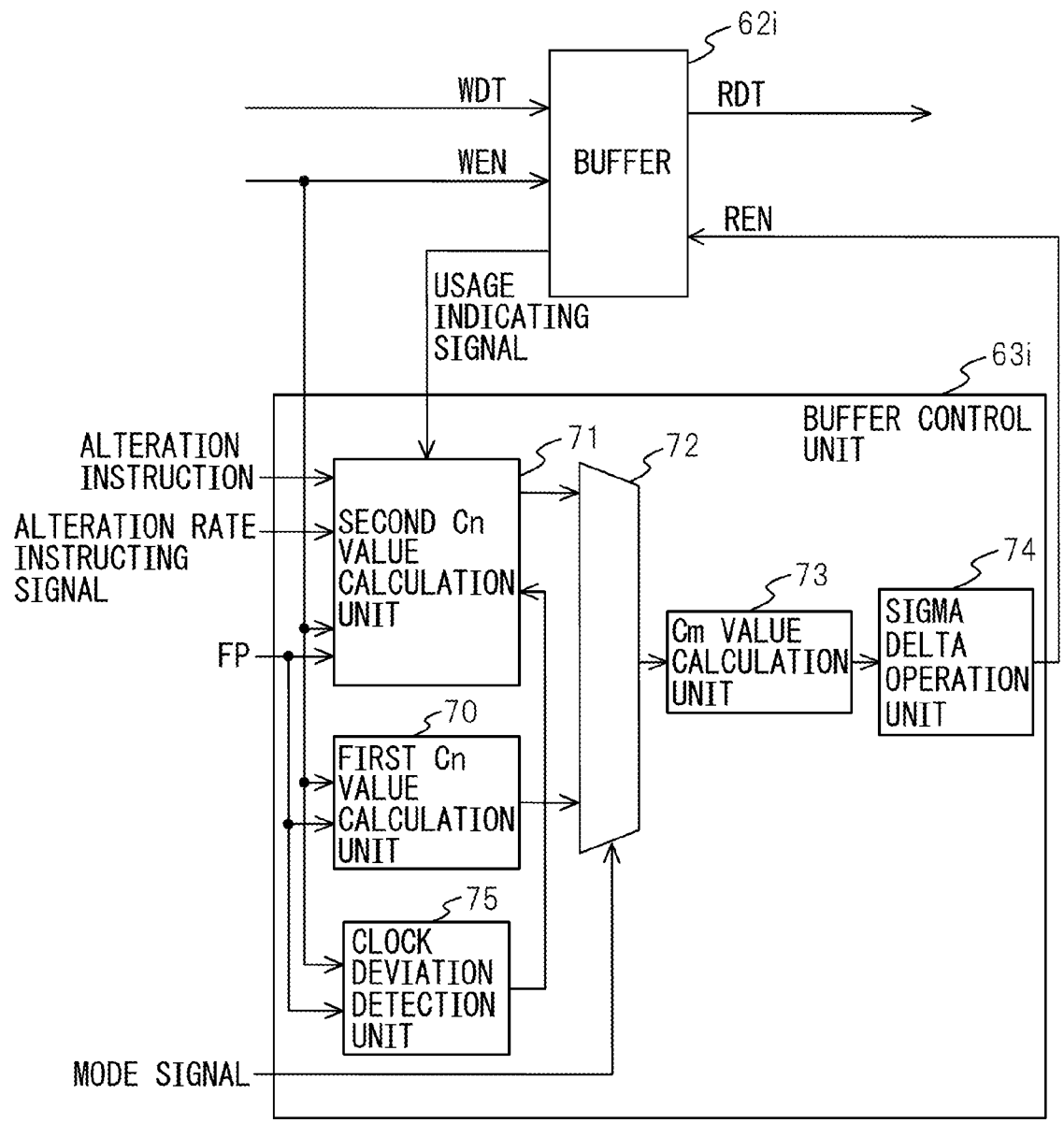
FIG. 13 is a view depicting a second example of a functional block diagram of the buffer control unit.

FIG. 13 is a view depicting a second example of functional block diagram of the buffer 63*i*. Same constituents as the constituents depicted in FIG. 8 are denoted by same reference numerals or symbols as in FIG. 8, and description of same function is omitted. The clock deviation detection unit 75 outputs the clock deviation $\Delta C$ detected based on equation (2) above to the second Cn value calculation unit 71.

Figure 14:
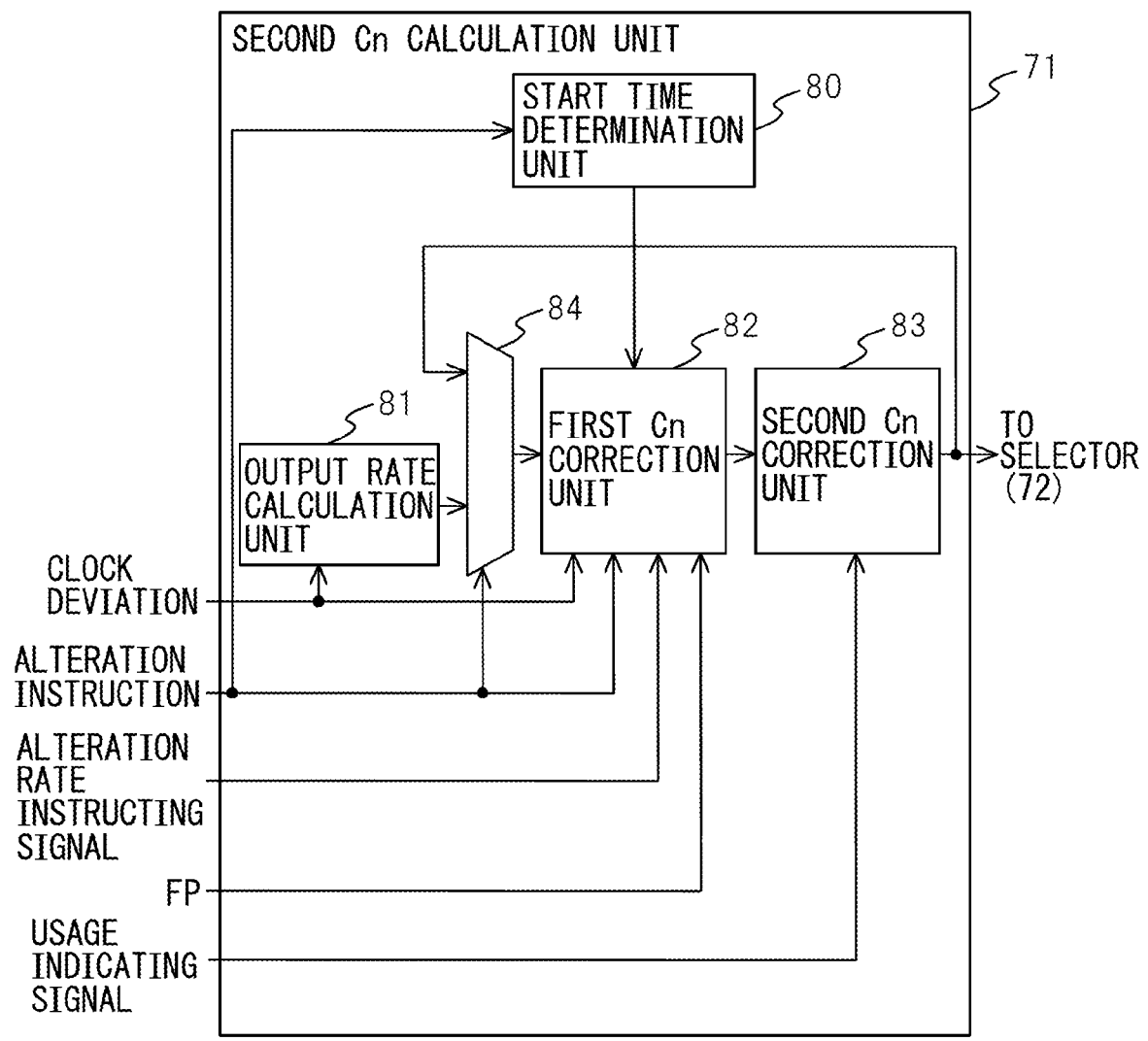
FIG. 14 is a view depicting a second example of a functional block diagram of the second Cn value calculation unit.

FIG. 14 is a view depicting a second example of functional block diagram of the second Cn value calculation unit 71. Same constituents as the constituents depicted in FIG. 9 are denoted by same reference numerals or symbols as in FIG. 9, and description of same function is omitted. The output rate calculation unit 81 calculates Cn value corresponding to the nominal transmission rate rn before alteration of transmission band as the initial value of Cn value before alteration of transmission band. The output rate calculation unit 81 calculates Cn' value of following equation (7) which corrects Cn value corresponding to nominal transmission rate rn with the clock deviation ΔC.

$$Cn' \text{ value} = Cn \text{ value} \times (1+\Delta C) \tag{7}$$

The output rate calculation unit 81 outputs the corrected Cn' value to the selector 84. The selector 84 selects the corrected Cn' value outputted from the output rate calculation unit 81 at the first frame period after the start of resizing operation, and outputs it to the first Cn correction unit 82.

The first Cn correction unit 82 corrects Cn' value inputted from the output rate calculation unit 81 with "rvn×(1+ΔC)", that is the nominal value rvn of the alteration rate instructed by the alteration rate instructing signal corrected with clock deviation ΔC. For example, the first Cn correction unit 82 determines the step width SW for changing Cn value stepwise for each frame period during resizing operation in accordance with the nominal value rvn of the alteration rate. The first Cn correction unit 82 calculates SW' of following equation (8) which corrects SW with the clock deviation ΔC.

$$SW' = SW \times (1+\Delta C) \tag{8}$$

The first Cn correction unit 82 corrects Cn' value inputted from the output rate calculation unit 81 with the corrected step width SW', and outputs it to the second Cn correction unit 83.

In the following frame periods, the selector 84 selects Cn value outputted from the second Cn correction unit 83, and outputs it again to the first Cn correction unit 82. As a result, Cn value outputted from the second Cn correction unit 83 is altered stepwise with the step width SW' corrected in each frame period.

Reduction of difference between input rate and output rate of the intermediate node 6i with correction by using the clock deviation ΔC will be described below. Deviations of clock frequency from nominal value of the source node 6s and the intermediate node 6i are denoted as "dFs" and "dFi", respectively. Nominal value of transmission rate before alteration of transmission band and nominal value of alteration rate of transmission band are denoted as "rn" and "rvn", respectively. Present time is denoted as "t", and alteration star time of transmission band of the source node 6s and the intermediate node 6i are denoted as "ts" and "ti", respectively.

On the other hand, if a nominal value of an alteration rate instructed by an alteration rate instructing signal during resizing operation is denoted as rvn, the alteration rate rvs in the source node 6s and the alteration rate rvi in the intermediate node 6i in the case where correction with the clock deviation ΔC is not performed are given by following equations $$rvs = rvn \times (1+dFs)$$

$$rvi = rvn \times (1+dFi)$$

The alteration rate rvi in the intermediate node 6i in the case where correction with the clock deviation ΔC is performed is given by following equation $$rvi = rvn \times (1+dFi) \times (1+\Delta C)$$
$$= rvn \times (1+dFi) \times (1+dFi-dFs)$$
$$\approx rvn \times (1+dFs)$$

Thus, alteration rate rvi of the intermediate node 6i corrected with the clock deviation ΔC is approximately equal to alteration rate rvs of the source node 6s. As a result, the alteration rates of input rate and output rate of the intermediate node 6i during resizing operation are nearly equal so that increase in the rate difference between input rate and output rate can be reduced.

Output rate ros of the source node 6s during resizing operation is given by following equation (9).

$$ros = (1+dFs) \times (rn + rvn \times (t-ts)) \tag{9}$$

On the other hand, output rate roi of the intermediate node 6i in the case where correction with the clock deviation ΔC is performed is given by following equation (10)

$$roi = (1+dFi) \times (rn + rvn \times (t-ti)) \times (1+\Delta C) \tag{10}$$
$$= (1+dFi) \times (rn + rvn \times (t-ti)) \times (1+dFi-dFs)$$
$$\approx (1+dFs) \times (rn + rvn \times (t-ti))$$

From equations (9) and (10), difference between input rate and output rate (ros−roi) of the intermediate node 6i is given by following equation (11)

$$ros - roi = (1+dFs) \times rvn \times (ti-ts) \tag{11}$$

The right side of the equation (11) represents the delay of alteration of output rate of the intermediate node 6i produced from the time difference (ti−ts) of the alteration start time of the transmission band between the source node 6s and the intermediate node 6i. Thus, in accordance with the above correction, a difference between input rate and output rate produced for reasons other than the time difference of the alteration start time of the transmission band between the source node 6s and the intermediate node 6i is reduced.

2.2. Resizing Operation

Figure 15:
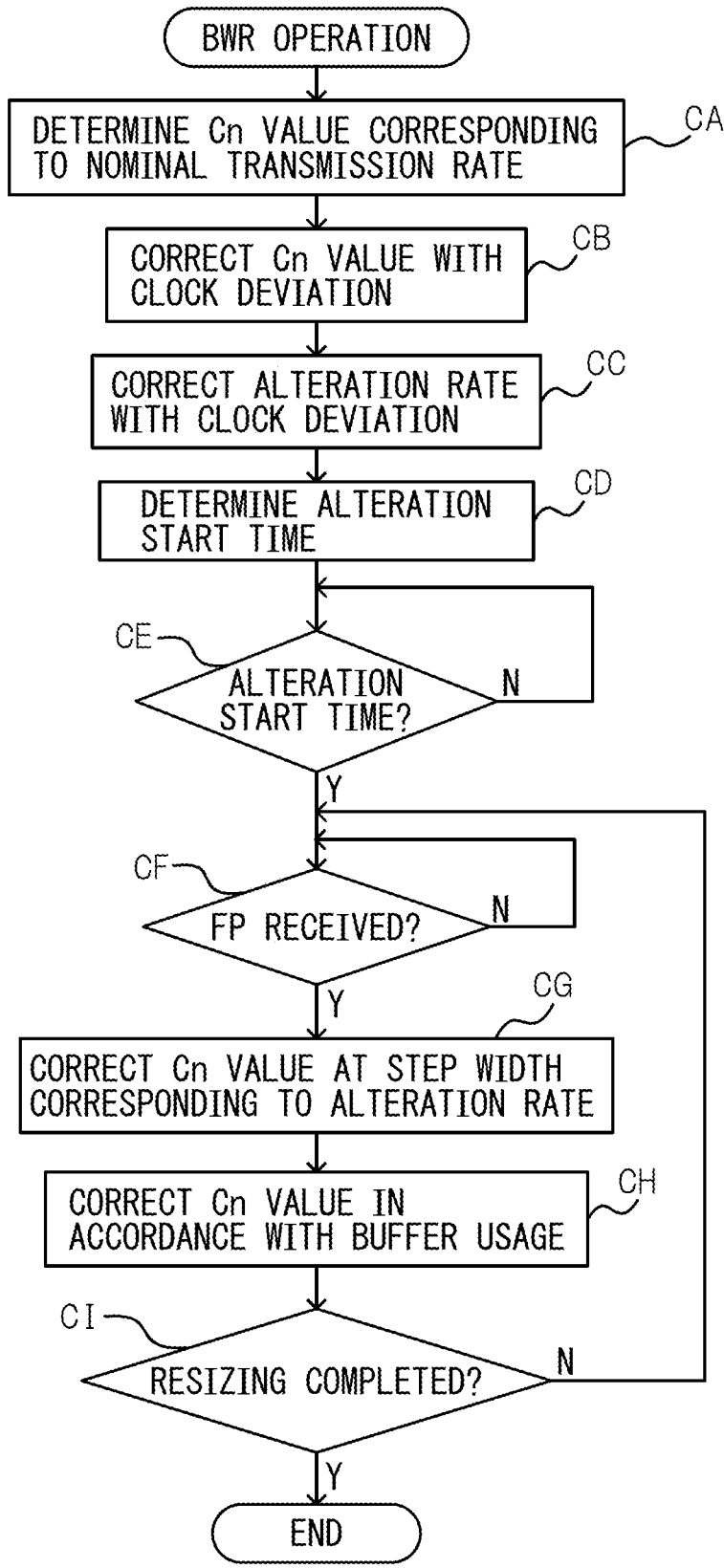
FIG. 15 is a view for illustrating a second example of the band resizing operation.

Next, BWR operation in the present exemplary embodiment will be described with reference to FIG. 15. In operation CA, the output rate calculation unit 81 determines Cn value corresponding to nominal transmission rate rn before alteration of transmission band. In operation CB, the output rate calculation unit 81 calculates corrected Cn' value corrected with the clock deviation ΔC. In operation CC, the first Cn correction unit 82 corrects transmission rate of the transmission band with the clock deviation ΔC.

The processing in operations CD to CF is the same as the processing in operations BC to BE. In operation CG, the first Cn correction unit 82 corrects the corrected Cn' corrected by the output rate calculation unit 81 with corrected alteration rate corrected with the clock deviation ΔC. The processing in operations CH and CI is the same as the processing in operations BG and BH depicted in FIG. 11. In operation loop CF to CI after the first time, the first Cn correction unit 82 corrects the corrected Cn' corrected by the second Cn correction unit 83 in previous loop with corrected alteration rate corrected with the clock deviation ΔC, and inputs it to the second Cn correction unit 83.

2.3. Effect of the Exemplary Embodiment

In accordance with the present exemplary embodiment, the alteration rate rvi of the intermediate node 6i can be made approximately equal to the alteration rate rvs of the source node 6s. Thus, the alteration rate of input rate and output rate in the intermediate node 6*i* during resizing operation becomes approximately equal, so that increase in the rate difference between input rate and output rate can be reduced. Therefore, size of the buffer for absorbing the variation of the rate difference between input rate and output rate can be reduced. As a result, even if speed of the alteration rate along with buffer size is increased in order to speed-up resizing operation, increase in the buffer size can be suppressed due to the conserving of the buffer size. Therefore, speed-up of the processing time of resizing operation is facilitated.

Also, in accordance with the present exemplary embodiment, difference between input rate and output rate of the intermediate node 6*i* due to reasons other than the time difference of the alteration start time between the source node 6*s* and the intermediate node 6*i* is reduced. Therefore, size of the buffer for absorbing the variation of the rate difference between input rate and output rate can be reduced. Even if speed of the alteration rate along with buffer size is increased in order to speed-up resizing operation, increase in the buffer size can be suppressed due to the conserving of the buffer size. Therefore, speed-up of the processing time of resizing operation is facilitated.

2.4. Variant of the Embodiment

Next, a variant of the present exemplary embodiment will be described. The amount of correction performed with clock deviation $\Delta C$ is a small numerical value, so that, if the output rate calculation unit 81 and the first Cn correction unit 82 correct Cn and transmission rate in unit of bytes, correction may become too rough in grain size, and as a result, proper correction is not achieved and the rate difference between input rate and output rate may be enlarged.

In this variant of the exemplary embodiment, the output rate calculation unit 81 and the first Cn correction unit 82 perform correction in unit smaller than bytes. For example, the output rate calculation unit 81 and the first Cn correction unit 82 accumulates a fraction less than one byte of the calculated value of the corrected Cn value and transmission rate. When the sum of the accumulated fractions amounts to a natural number n or greater, the output rate calculation unit 81 and the first Cn correction unit 82 may add correction of n bytes to Cn value and the transmission rate.

In an exemplary embodiment, the unit of fractions accumulated by the output rate calculation unit 81 and the first Cn correction unit 82 is 1/10000 byte. The second Cn correction unit 83 may similarly correct Cn value in unit of less than one byte.

3. Third Exemplary Embodiment

Next, another exemplary embodiment of the transmission apparatus 6 will be described. As has been described above, alteration of transmission band during resizing operation is performed by changing transmission band by a step width at each constant period. As the alteration period for changing transmission band during resizing operation, a period different from the frame period of the transmission apparatus 6 may be designated. However, alteration of transmission band in the transmission apparatus 6 is realized as change of data amount accommodated in a frame. Therefore, actual alteration of transmission band takes place at each frame period at which the transmission apparatus 6 outputs a frame.

Figure 16:
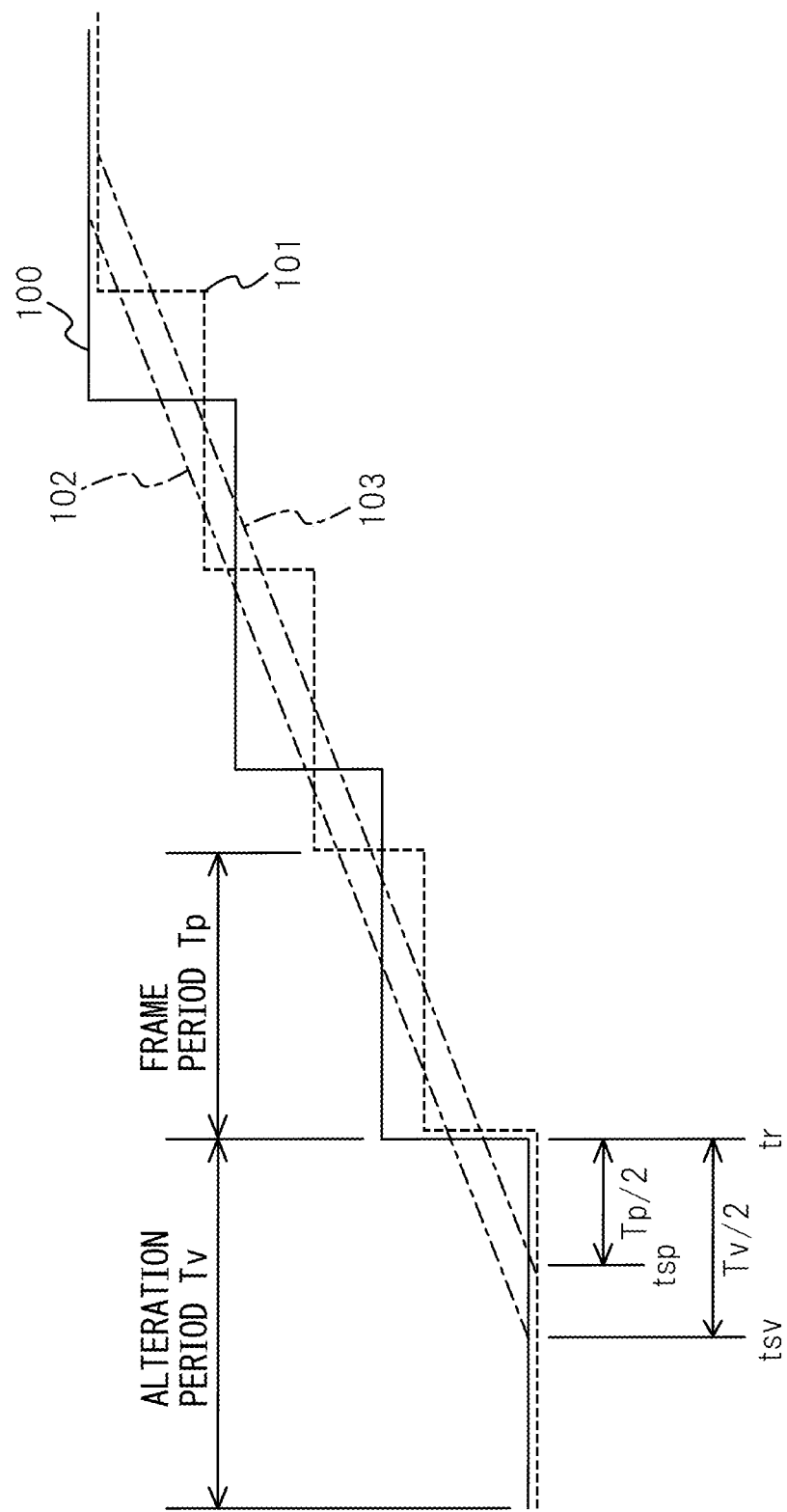
FIG. 16 is a view for illustrating an example of an alteration period for changing transmission band and a frame period.

FIG. 16 is a view for illustrating an example of alteration period Tv for altering transmission band and frame period Tp. Solid line 100 depicts transmission rate in the case where it is increased at the same period as the alteration period Tv of transmission band during resizing operation. Dotted line 101 depicts transmission rate in the case where it is altered at each frame period Tp at the same alteration rate as the transmission rate 100.

Transmission rates 100 and 101 are altered stepwise, and their average transmission rates are as depicted by the dashed dotted line 102 and the dashed double dotted line 103, respectively. Their substantial alteration start time of transmission band alteration is denoted by tsv and tsp, respectively. As depicted in FIG. 16, the alteration start time tsp of transmission rate 101 changing in frame period Tp is behind the alteration start time tsv of transmission rate 100 changing in alteration period Tv by (Tv−Tp)/2.

Thus, if the period Tv designated as alteration period of the transmission band during resizing operation is different from the frame period Tp, the alteration start time of actual output rate of the transmission apparatus 6 is shifted by (Tv−Tp)/2 as compared to the case where the transmission rate is actually altered with the period Tv. Due to this shift, increase of the time difference between the alteration start time of input rate and the alteration start time of output rate of the transmission apparatus 6 leads to variation of the rate difference between input rate and output rate.

In the present exemplary embodiment, the start time determination unit 80 depicted in FIG. 14 adopts a time obtained by correcting the alteration start time in the case where transmission rate is altered at period Tv designated as the alteration period by (Tv−Tp)/2 as the alteration start time.

The present exemplary embodiment can suppress variation of rate difference between input rate and output rate by correcting the alteration start time, and by reducing the increase of time difference between the alteration start time of input rate and the alteration start time of output rate of the transmission apparatus 6. As a result, increase of the rate difference between input rate and output rate can be suppressed. Alteration start time of transmission band may also be similarly corrected in the fourth and fifth exemplary embodiments as in the present third exemplary embodiment.

4. Fourth Exemplary Embodiment

Next, other exemplary embodiment will be described. The input rate of the transmission apparatus 6 may vary due to various reasons. Therefore, even if the frame period and the output rate are corrected in accordance with the clock deviation, the variation of the input rate may produce rate difference between input rate and output rate. As a result, usage of the buffer provided for absorbing the rate difference may vary.

The second Cn correction unit 83 depicted in FIG. 9 is provided for elimination of the variation of buffer usage described above. Based on the usage of the buffer 62*i*, the second Cn correction unit 83 corrects Cn value so as to keep the usage of the buffer 62*i* constant. However, if correction of Cn value is delayed relative to alteration of the input rate, usage of the buffer 62*i* may not converge to a constant value and the variation of the buffer usage may not be reduced.

Figure 17:
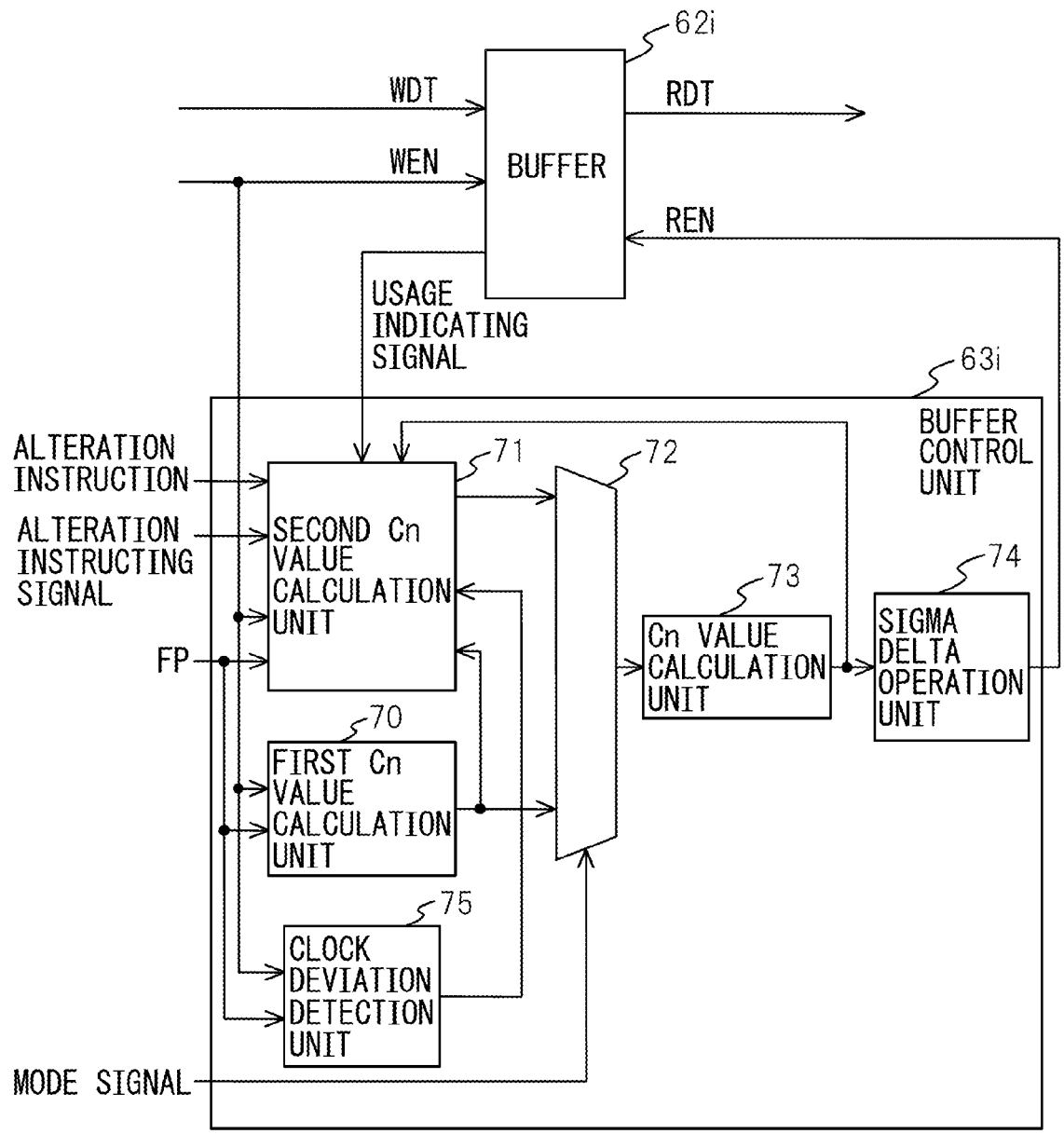
FIG. 17 is a view depicting a third example of a functional block diagram of the buffer control unit.

In the present exemplary embodiment, Cn value is corrected in accordance with the rate difference between input rate and output rate. FIG. 17 is a view depicting a third example of functional block diagram of the buffer control unit 63*i*. Same constituents as the constituents depicted in FIG. 13 are denoted by same reference numerals or symbols as used in FIG. 13, and description of same function is omitted. The second Cn value calculation unit 71 inputs Cn value calculated by the first Cn value calculation unit 70 and Cm value calculated by Cm value calculation unit 73.

Figure 18:
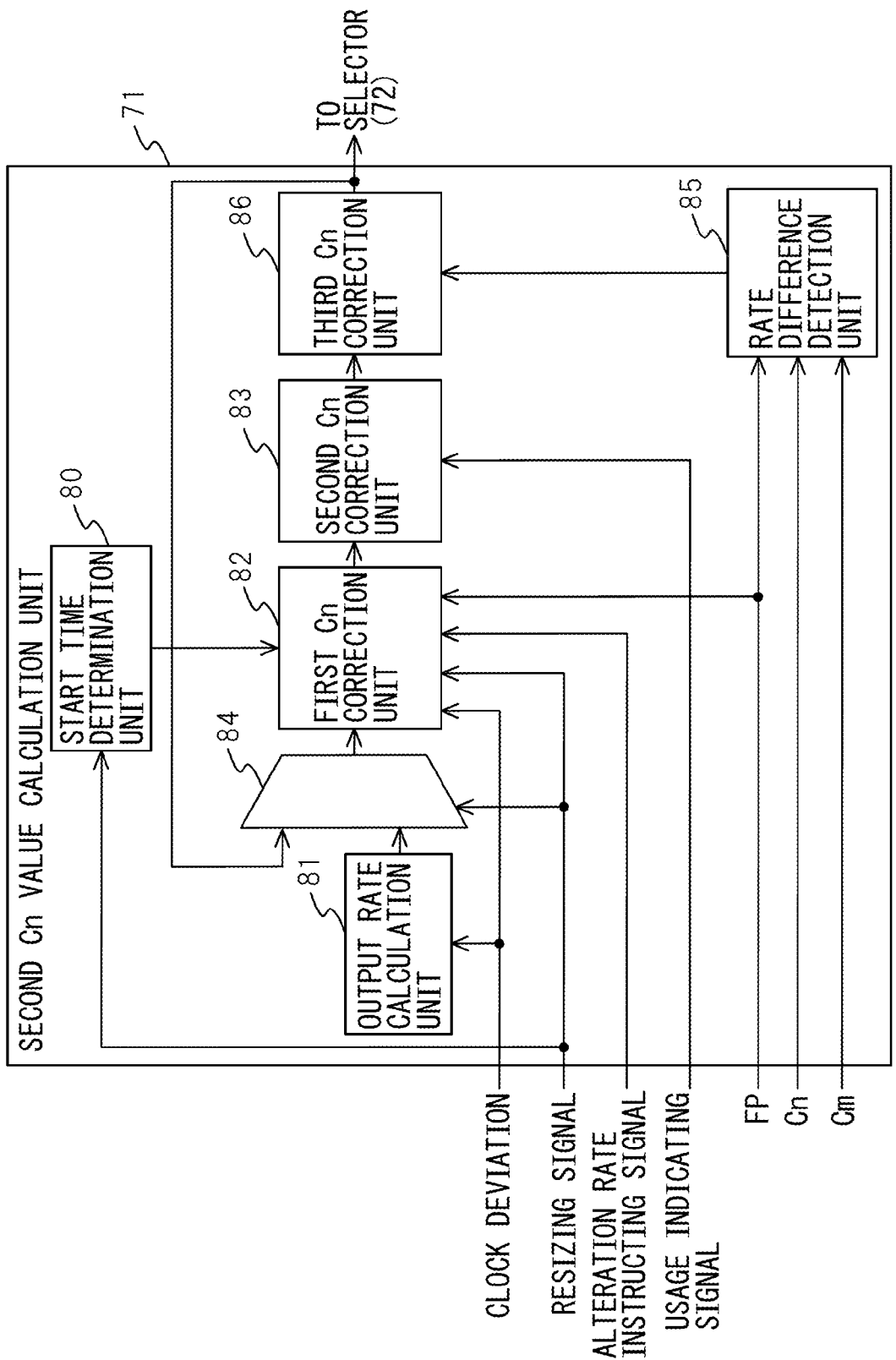
FIG. 18 is a view depicting a third example of a functional block diagram of the second Cn value calculation unit.

FIG. 18 is a view depicting a third example of functional block diagram of the second Cn value calculation unit 71. Same constituents as the constituents depicted in FIG. 14 are denoted by same reference numerals or symbols as used in FIG. 14, and description of same function is omitted. The second Cn value calculation unit includes a rate difference detection unit 85 and a third Cn correction unit 86.

The rate difference detection unit 85 inputs Cn value calculated by the first Cn value calculation unit 70, Cm value calculated by the Cm value calculation unit 73, and FP. The first Cn value calculation unit 70 outputs the number of enable signal WEN occurring in each frame period as Cn value. Therefore, Cn value outputted by the first Cn value calculation unit 70 reflects the input rate. Cm value calculated by Cm value calculation unit 73 is used in generation of read-out enable signal REN from the buffer 62i by the sigma delta operation unit 74. Therefore, Cm value reflects the output rate. The rate difference detection unit 85 detects the rate difference between input rate and output rate based on these Cn and Cm values. The rate difference detection unit 85 outputs the rate difference to the third Cn correction unit 86.

The third Cn correction unit 86 corrects the corrected value inputted from the second Cn correction unit 83, based on the detected rate difference, so as to reduce the variation of the usage of the buffer 62i due to this rate difference. For example, the third Cn correction unit 86 corrects the corrected value inputted from the second Cn correction unit 83 in accordance with following equation (12).

$$Cn \text{ value after correction} = \text{inputted } Cn \text{ value} + \text{rate difference} \times \alpha \quad (12)$$

Figure 19:
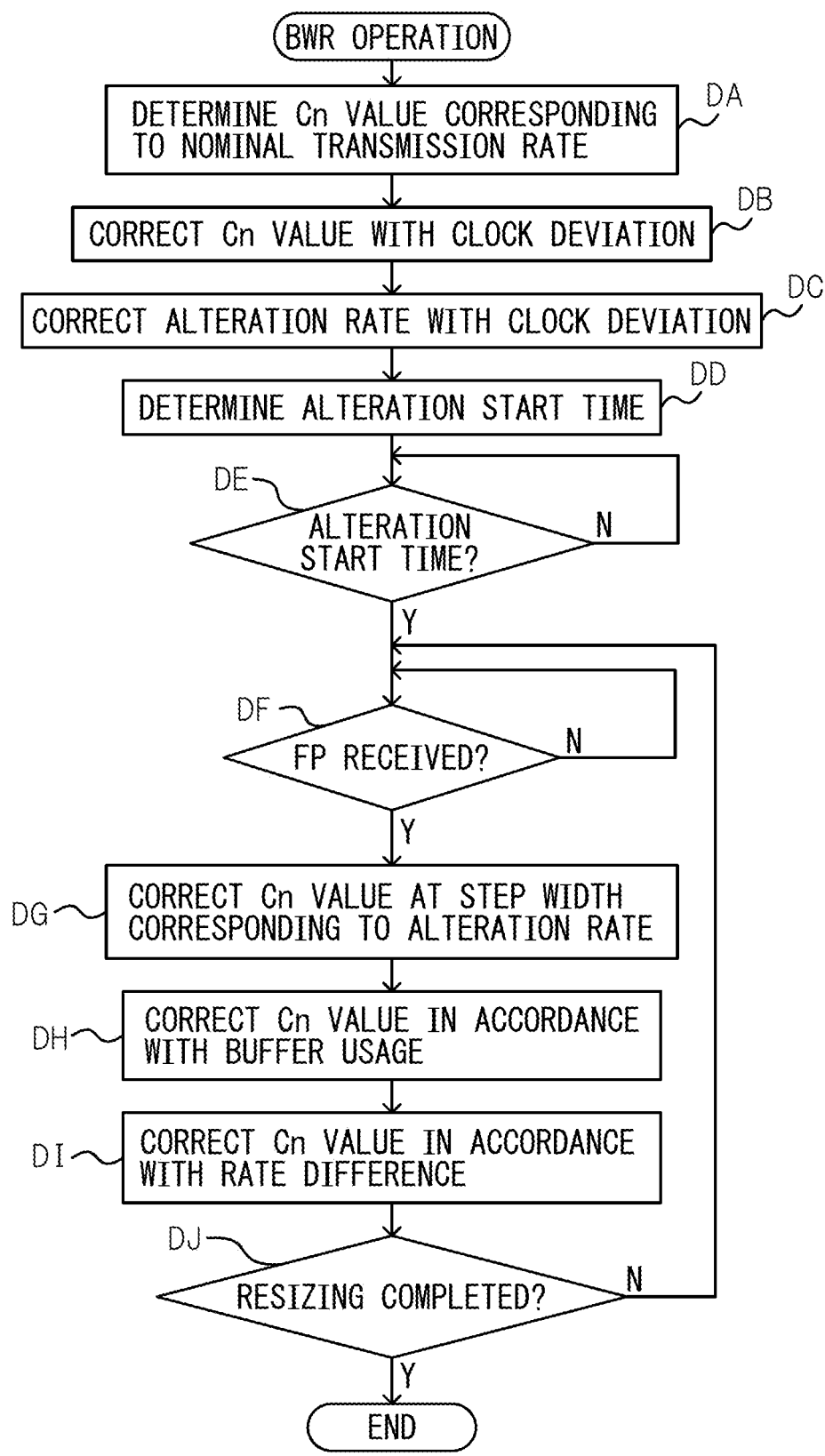
FIG. 19 is a view for illustrating a third example of the transmission band resizing operation.

Next, BWR operation in the present exemplary embodiment will be described with reference to FIG. 19. The processing in operations DA to DH is the same as the processing in operations CA to CH depicted in FIG. 15. In operation DI, the third Cn correction unit 86 corrects Cn value corrected by the second Cn correction unit 83 in accordance with the rate difference. In operation DJ, the buffer control unit 63i determines whether or not resizing operation has been completed. If resizing operation has been completed (operation DJ: Y), the processing is terminated. If resizing operation has not been completed (operation DJ: N), the processing returns to operation DF.

In accordance with the present exemplary embodiment, rate difference between input rate and output rate is detected, and output rate is corrected so as to reduce variation of usage of the buffer for absorbing the rate difference. Therefore, usage of the buffer can be quickly adjusted in response to variation of the rate difference. As a result, usage of buffer can be easily converged, and variation of usage of usage of the buffer can be suppressed. Therefore, size of the buffer can be reduced, and circuit size and transmission delay of data can be reduced.

Also, in accordance with the present exemplary embodiment, even if, in order to speed-up resizing operation, alteration rate is increased along with increase of buffer, increase of buffer size can be suppressed thanks to the buffer saving with the present exemplary embodiment. Therefore, speed-up of resizing operation is facilitated.

Similarly in MUX 55s of the source node 6s, output rate of MUX 55 may be corrected in accordance with rate difference between input rate and output rate. Also in the first exemplary embodiment described above and in the fifth exemplary embodiment to be described below, output rate may be corrected in the same manner as in the present fourth exemplary embodiment. The third Cn correction unit 86 may correct Cn value in small unit less than one byte as in the output rate calculation unit 81 and the first Cn correction unit 82 in the second exemplary embodiment.

5. Fifth Exemplary Embodiment

Next, another exemplary embodiment of the transmission apparatus 6 will be described. The transmission apparatus 6 determines the start time of implementing the resizing operation at the time when alteration instructing signal instructing the resizing operation is received. On the other hand, an OPU header accommodating the alteration instructing signal is accommodated once in the buffer in each transmission apparatus 6, and then is outputted to the frame circuit in later stage. Thus, the alteration instructing signal is delayed by retention time in the buffer, and is then outputted to the transmission apparatus 6 in next stage.

Therefore, there is a difference of start time of resizing operation between the transmission apparatus 6 transmitting the alteration instructing signal in previous stage and the transmission apparatus in subsequent stage. Difference of start time of resizing operation is also produced in the same transmission apparatus 6 between the internal frame processing unit 52i and MUX 55i.

Figure 20A:
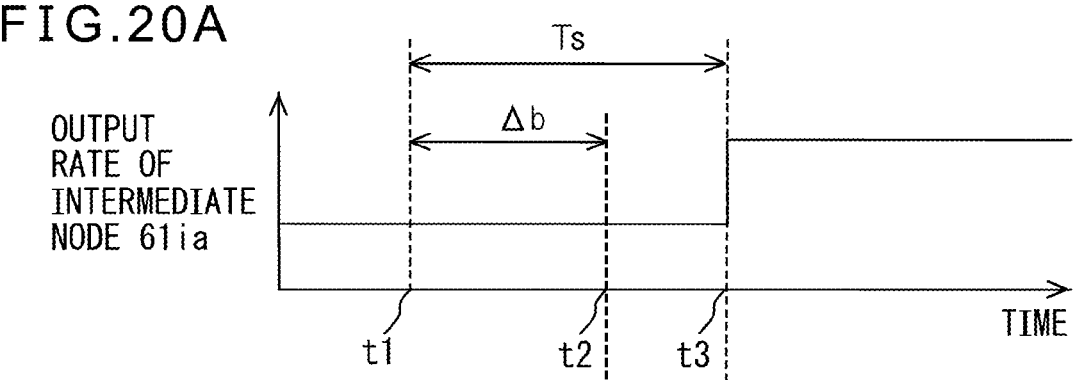
FIG. 20A is a view for illustrating the input and output rates of an intermediate node.

This difference of start time of resizing operation will be described with reference to FIG. 20A to FIG. 20C. FIG. 20A is a view depicting change of output rate of the intermediate node 6ia, FIG. 20B and FIG. 20C are views depicting change of input rate and output rate of the intermediate node 6ib that is one stage later than the intermediate node 6ia.

In FIG. 20A, the signs t1, t2 and t3 indicate, respectively, reception time of the alteration instructing signal, transmission time of the alteration instructing signal, and start time of resizing operation in the intermediate node 6ia. The intermediate node 6ia receiving the alteration instructing signal at time t1 transmits the alteration instructing signal at time t2 that is behind time t1 by delay time Δb due to the buffer. The intermediate node 6ia starts alteration of output rate at time t3 when prescribed waiting time Ts has elapsed after reception time t1 of the alteration instructing signal. Length of the waiting time Ts from detection of the alteration instructing signal to start of alteration of transmission band is designated beforehand, for example, by the standard on which the communication system 1 is based.

Figure 20B:
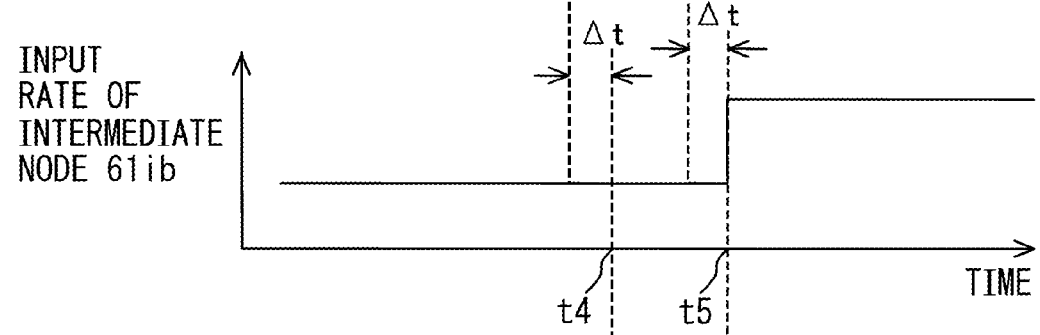
FIG. 20B is a view for illustrating the input and output rates of an intermediate node.
Figure 20C:
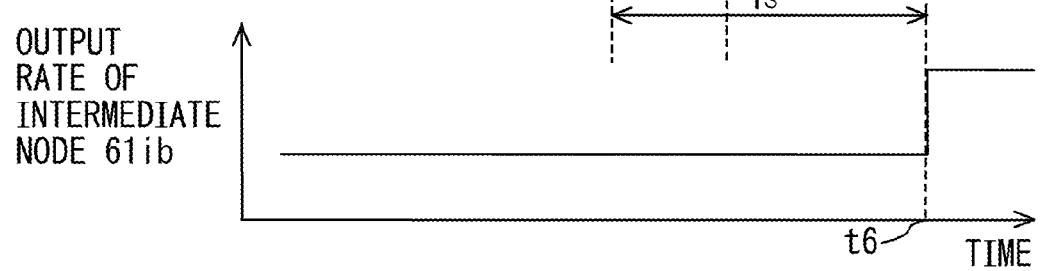
FIG. 20C is a view for illustrating the input and output rates of an intermediate node.

In FIG. 20B, the signs t4 and t5 indicate, respectively, reception time of the alteration instructing signal and alteration time of input rate in the intermediate node 6ib. The alteration instructing signal is received by the intermediate node 6ib at time t4 that is delayed by transmission delay time Δt between the intermediate nodes 6ia and 6ib behind time t2. The input rate of the intermediate node 6ib is altered at time t5 that is delayed from the alteration of output rate in the intermediate node 6ia by transmission delay time Δt.

The intermediate node 6ib alters output rate at time t6 when time period Ts has elapsed from the reception time t4 of the alteration instructing signal. Thus, alteration of output rate in the intermediate node 6ib is delayed from alteration of input rate by the buffer delay time Δb. In this way, if the alteration instructing signal is delayed due to storage in the buffer, difference is produced in the start time of resizing operation between the intermediate node 6ia in the preceding stage and the intermediate node 6ib in the following stage, and rate difference between input rate and output rate is produced in the intermediate node 6ib in the following stage.

In the present exemplary embodiment, information relating to the transmission delay produced in the buffers of the internal frame processing unit 52i and MUX 55i that perform mapping and multiplexing of frames is notified to the following stage. The internal frame processing unit 52*i* and MUX 55*i* of the following stage that perform resizing operation correct the start time of resizing operation in accordance with the notified transmission delay.

Figure 21:
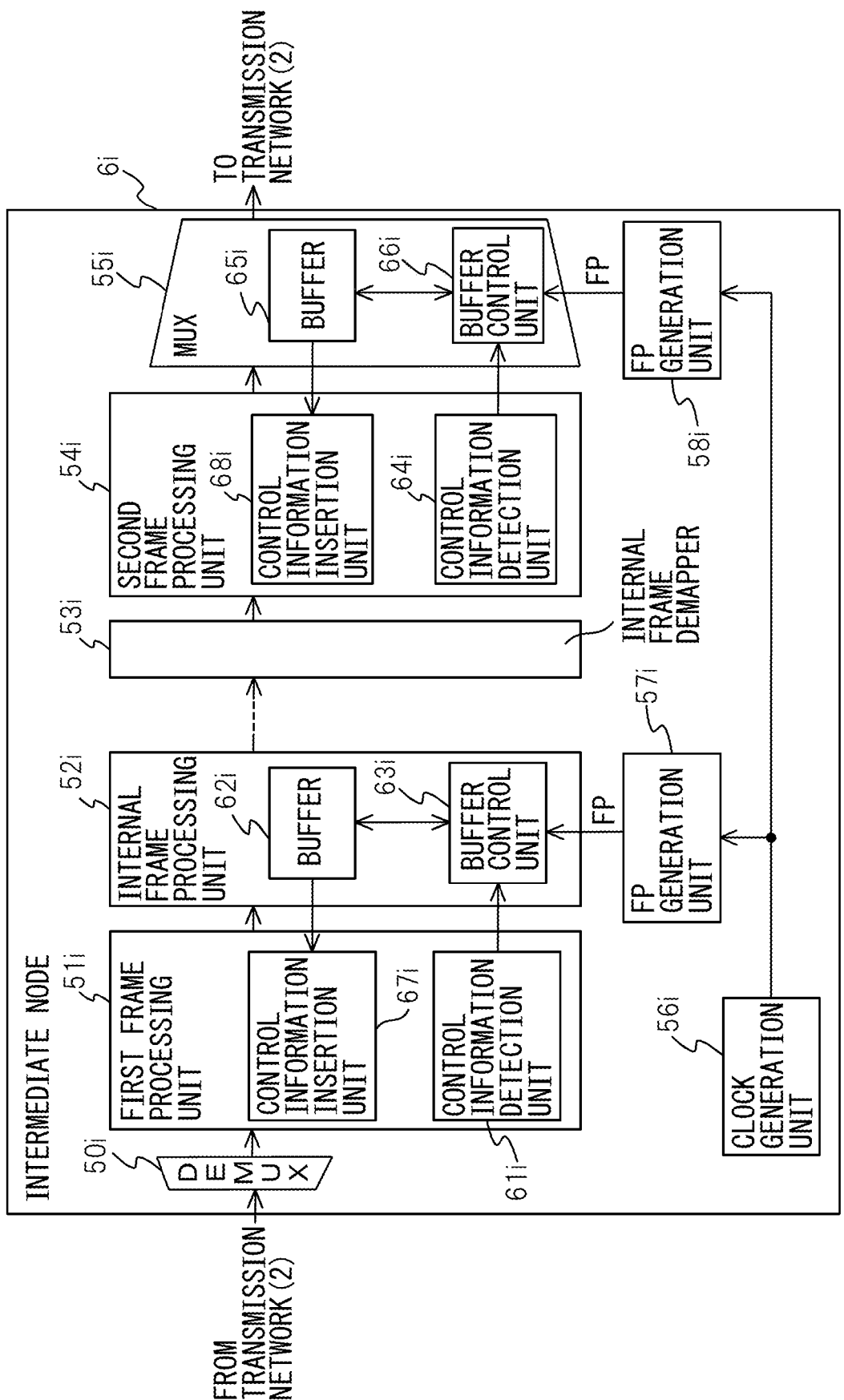
FIG. 21 is a view depicting a third example of a functional block diagram of the intermediate node.

FIG. 21 is a view depicting a third example of functional block diagram of the intermediate node 6*i*. Same constituents as the constituents depicted in FIG. 12 are denoted by same reference numerals or symbols as used in FIG. 12, and description of same function is omitted. The first frame processing unit 51*i* and the second frame processing unit 54*i* include control information insertion units 67*i* and 68*i*. The control information insertion units 67*i* and 68*i* insert usage indicating information that indicates usage of buffer 62*i* and 65*i* of the internal frame processing unit 52*i* and MUX 55*i* as the information relating to data transmission delay produced in these buffers into the header of OPU frames. Similarly, the second frame processing unit 54*s* of the source 6*s* inserts the usage indicating information that informs usage of buffer of MUX 55*s*.

Figure 22:
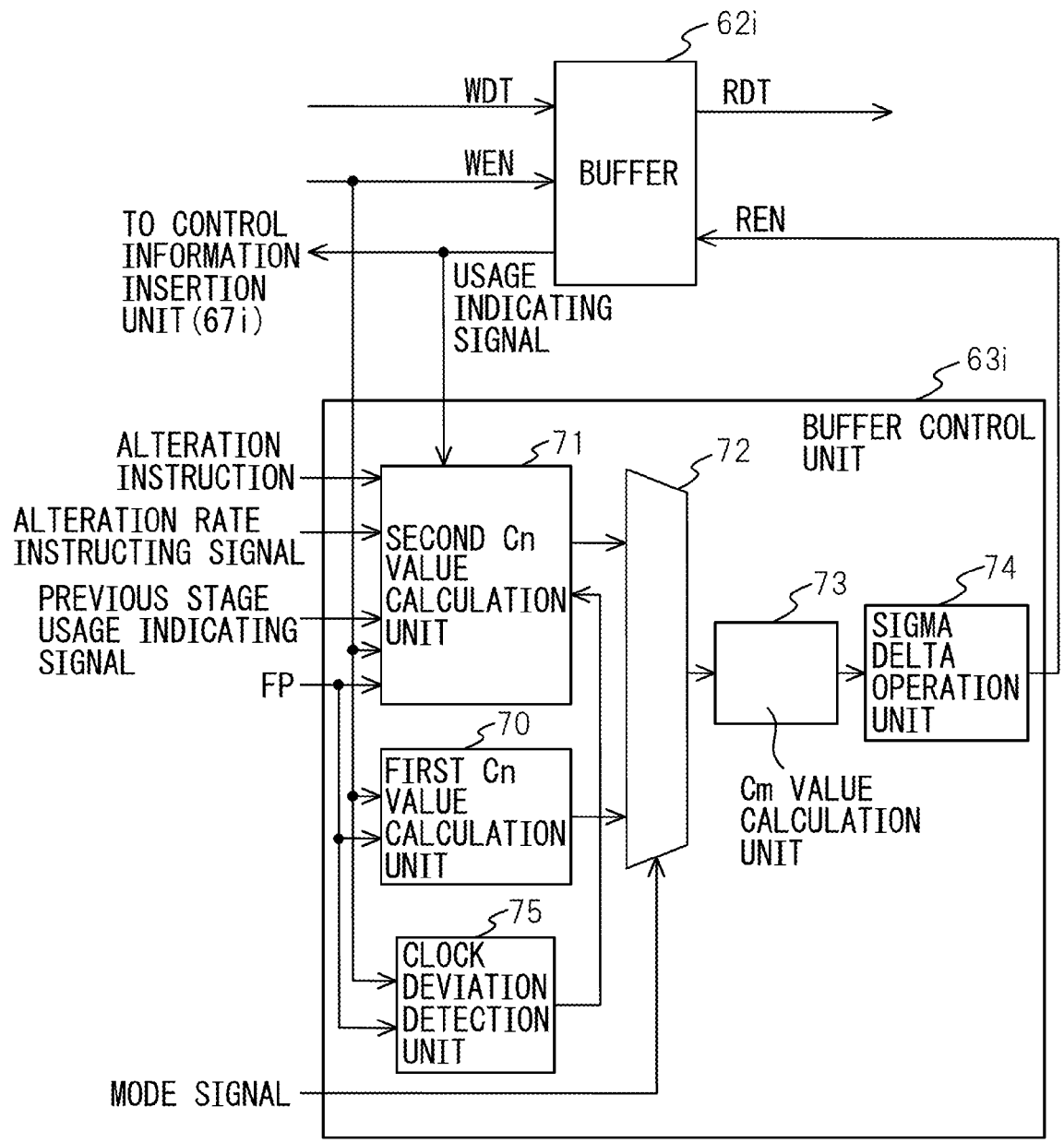
FIG. 22 is a view depicting a fourth example of a functional block diagram of the buffer control unit.

FIG. 22 is a view depicting a fourth example of functional block diagram of the buffer control unit 63*i* in the internal frame processing unit 52*i*. Same constituents as the constituents depicted in FIG. 13 are denoted by same reference numerals or symbols as used in FIG. 13, and description of same function is omitted. The second Cn value calculation unit 71 inputs the usage indicating information inserted by the second frame processing unit 54*s* of the source node 6*s* in the preceding stage.

Figure 23:
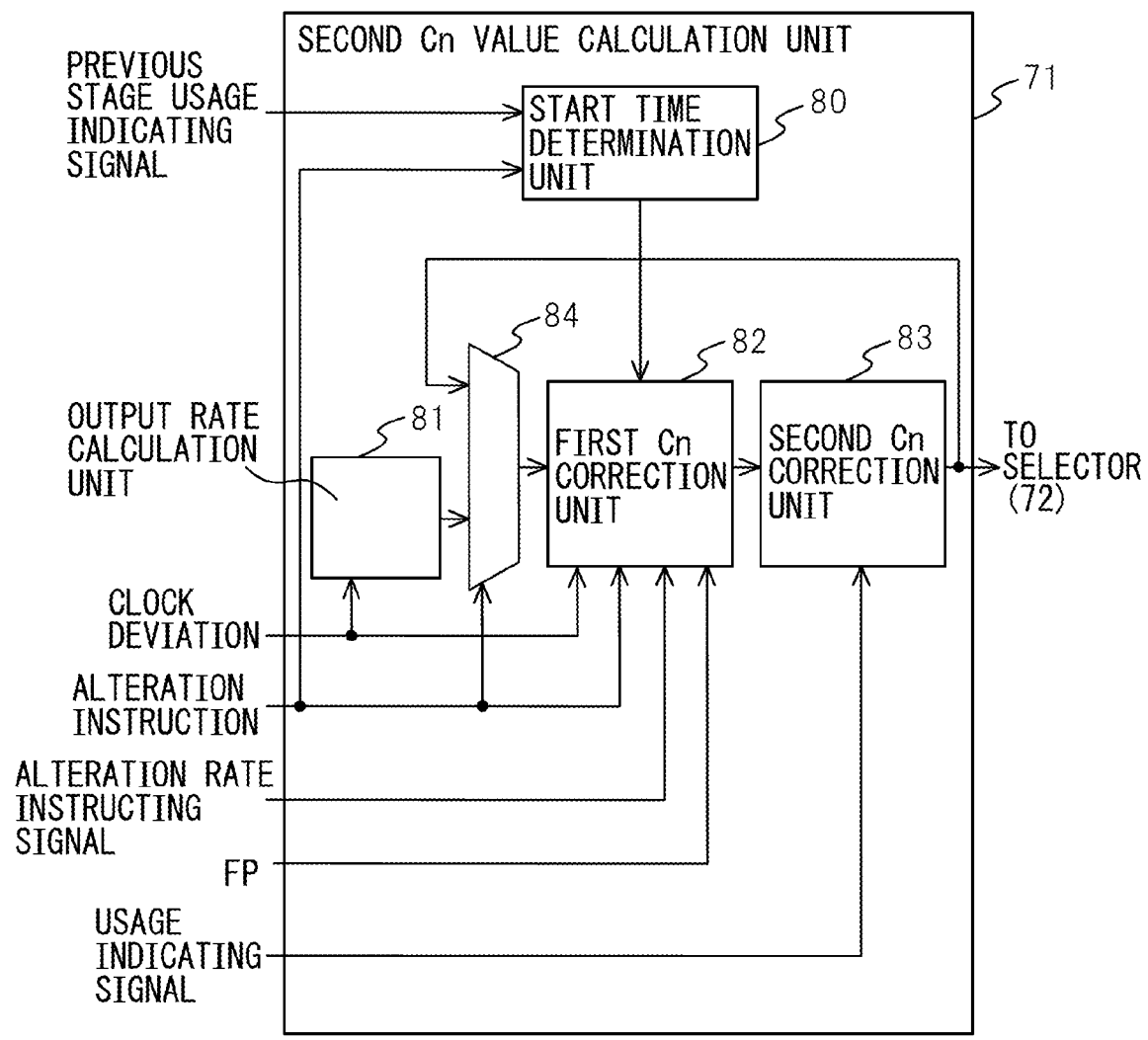
FIG. 23 is a view depicting a fourth example of a functional block diagram of the second Cn value calculation unit.

FIG. 23 is a view depicting a fourth example of functional block diagram of the second Cn value calculation unit 71. Same constituents as the constituents depicted in FIG. 14 are denoted by same reference numerals or symbols as used in FIG. 14, and description of same function is omitted. The start time determination unit 80 calculates data transmission delay produced in the buffer of MUX 55*s* of the source node 6*s* in accordance with the usage indicating information. The start time determination unit 80 corrects the proper alteration start time after elapse of prescribed waiting time from the time of detection of the alteration instructing signal to a time earlier by the data transmission delay. Similarly, the buffer control unit 66*i* in MUX 55*i* also corrects the alteration start time for starting alteration of transmission band based on the usage indicating information inserted by the control information insertion unit 67*i* of the first frame processing unit 51*i* in the preceding stage.

Figure 24:
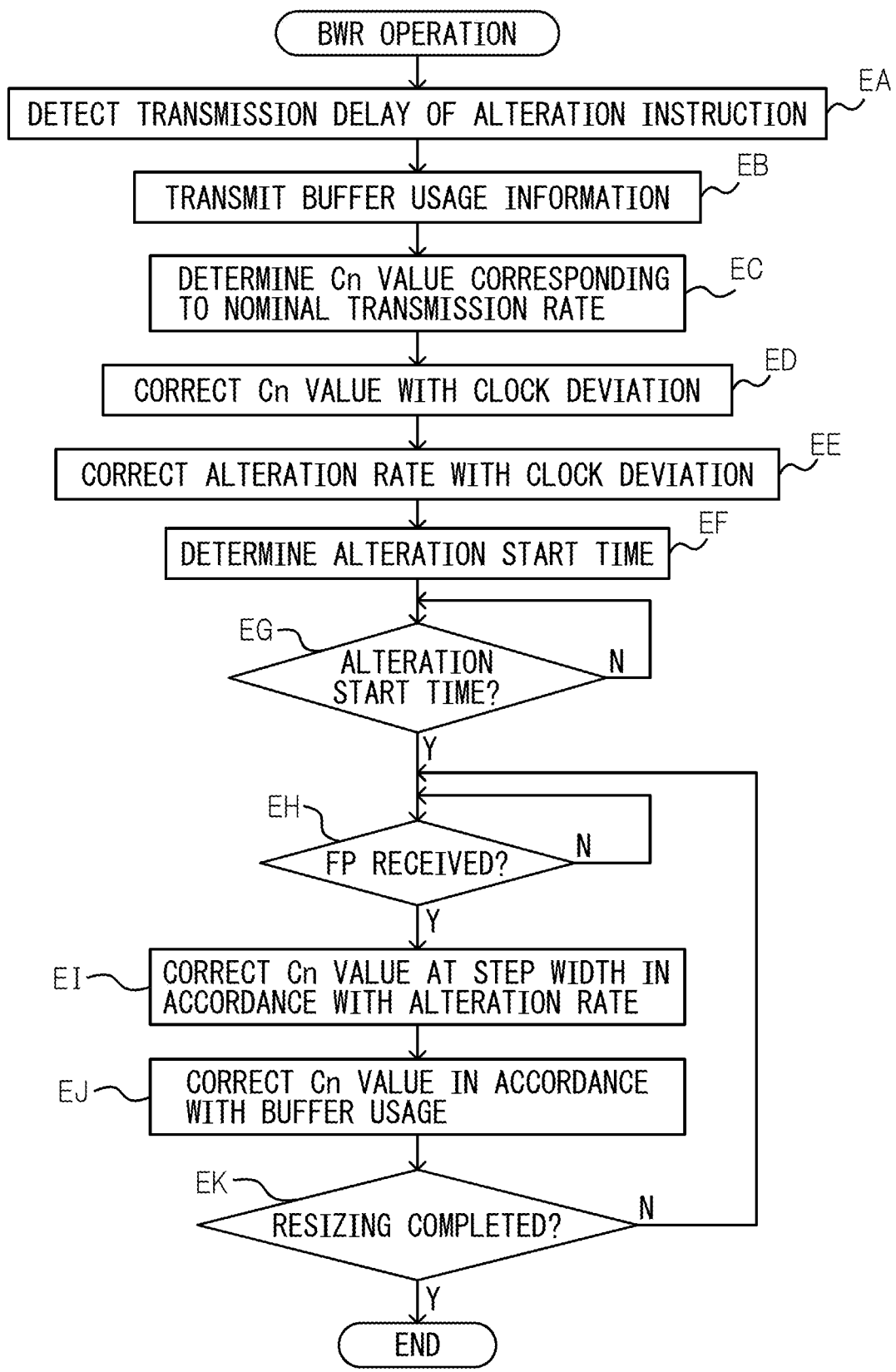
FIG. 24 is a view for illustrating a fourth example of the transmission band resizing operation.

Next, BWR operation in the present exemplary embodiment will be described with reference to FIG. 24. In operation EA, transmission delay of alteration instruction is detected. In operation EB, the control information insertion unit 67*i* and 68*i* of the first frame processing unit 51*i* and the second frame processing unit 54*i* of the intermediate node 6*i* insert the usage indicating information on the buffers 62*i* and 65*i* into the header of OPU frame. Similarly, the second frame processing unit 54*s* of the source node 6*s* inserts the usage indicating information on the buffer of MUX 55*i* into the header of OPU frame. The processing in operations EC to EE is the same as the processing in operations CA to CC of FIG. 15.

In operation EF, the start time determination unit 80 of the buffer control unit 63*i* in the internal frame processing unit 52*i* corrects the alteration start time for changing transmission band by the buffer control unit 63*i* in accordance with the usage indicating information inserted by the second frame processing unit 54*s* of the source node 6*s*. Similarly, the buffer control unit 66*i* in MUX 55*i* corrects the alteration start time for altering transmission band based on the usage indicating information inserted by the control information insertion unit 67*i* of the first frame processing unit 51*i*. Processing in operations EG to EK is the same as the processing in operations CE to CI of FIG. 15.

In accordance with the present exemplary embodiment, difference between input rate and output rate produced due to delay of the alteration instructing signal in the buffer of the transmission apparatus 6 can be reduced. Therefore, size of the buffer for absorbing the difference between input rate and output rate can be reduced. As a result, even if alteration rate is increased along with increase of buffer size in order to speed-up resizing operation, the increase of buffer size can be suppressed by saving of buffer with the present exemplary embodiment. Thus, speed-up of processing time for resizing operation is facilitated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A transmission apparatus for transmitting frames accommodating client data over a transmission network, comprising:

a clock generation unit that generates a clock for timing processing period of signal processing;

a deviation detection unit that detects clock deviation between the clock generated by the clock generation unit and a clock used for timing processing period of signal processing by other transmission apparatus that receives the client data from outside the transmission network and adds them to frames, the other transmission apparatus having performed a resizing operation to alter a transmission band of the client data; and a timing generation unit that generates timing signal of processing period of signal processing corrected with the clock deviation.

2. The transmission apparatus according to claim 1, further comprising a transmission band alteration unit that alters the transmission band of client data stepwise in each of the corrected processing period.

3. A transmission apparatus for transmitting frames accommodating client data over a transmission network, comprising:

a clock generation unit that generates a clock for timing processing period of signal processing;

a deviation detection unit that detects clock deviation between a clock used for timing processing period of signal processing by other transmission apparatus that receives the client data from outside the transmission network and adds them to frames and the clock generated by the clock generation unit, the other transmission apparatus having performed a resizing operation to alter a transmission band of the client data; and a transmission band alteration unit that alters transmission band of the client data at alteration rate corrected in accordance with the clock deviation.

4. The transmission apparatus according to claim 3, further comprising:
- an output rate calculation unit that calculates output rate by correcting nominal transmission rate of the client data in accordance with the clock deviation;
- wherein the transmission band alteration unit alters transmission band of client data by altering the output rate calculated by the output calculation unit at the corrected alteration rate.

5. The transmission apparatus according to claim 3, wherein the deviation detection unit calculates the clock deviation based on transmission data amount transmitted in a certain time period at nominal transmission rate of the client data and inputted data amount in a period in which the certain time period is counted based on the clock generated by the clock generation unit.

6. The transmission apparatus according to claim 3, further comprising a transmission band correction unit that corrects the transmission band of the client data in accordance with the difference between input rate and output rate of the client data.

7. The transmission apparatus according to claim 6, wherein the transmission band correction unit accumulates fraction less than one byte of the calculated value of transmission band after correction, and adds the sum to the transmission band.

8. The transmission apparatus according to claim 3, further comprising an instruction detection unit that detects alteration instruction for altering the transmission band of the client data;
- wherein the transmission band alteration unit alters the transmission band of the client data stepwise at each frame period of frames; and
- wherein the transmission apparatus further comprises a start time determination unit that determines the start time for altering the transmission band based on the detection time of the alteration instruction and length of the frame period.

9. The transmission apparatus according to claim 8, wherein, in the case where the certain alteration period defining the period for altering the transmission band stepwise and the frame period are different, the start time determination unit corrects the alteration start time by half of the difference between the certain alteration period and the frame period, as compared to the case where the transmission band is altered by the certain alteration period.

10. The transmission apparatus according to claim 3, further comprising:
- an instruction detection unit that detects alteration instruction for altering the transmission band of the client data;
- a delay detection unit that detects the amount of transmission delay of the alteration instruction; and
- a start time determination unit that determines the alteration start time for altering the transmission band based on the detection time of the alteration instruction and the amount of transmission delay.

11. The transmission apparatus according to claim 10, wherein the delay detection unit detects transmission delay information indicating the amount of transmission delay from the header of the frame accommodating client data.

12. The transmission apparatus according to claim 11, further comprising:
- a buffer for storing the received alteration instruction until transmission; and
- a transmission delay information insertion unit that inserts usage information of the buffer into the header as transmission delay information of the alteration instruction.

13. The transmission apparatus according to claim 3, wherein the transmission band alteration unit accumulates fraction less than one byte of calculated value of transmission band after correction and adds the sum to the transmission band.

14. A transmission method for transmitting client data accommodated in a frame over a transmission network, comprising:
- generating a clock for timing processing period of signal processing;
- detecting clock deviation between the clock and a clock used for timing processing period of signal processing in other transmission apparatus that receives the client data from outside the transmission network and adds them to a frame, the other transmission apparatus having performed a resizing operation to alter a transmission band of the client data; and
- correcting processing period of signal processing for transmission of the client data.

15. A method of altering transmission band for transmitting client data accommodated in a frame over a transmission network, comprising
- generating a clock for timing processing period of signal processing;
- detecting clock deviation between the generated clock and a clock used for timing processing period of signal processing in other transmission apparatus that receives the client data outside the transmission network and adds it to a frame, the other transmission apparatus having performed a resizing operation to alter a transmission band of the client data; and
- altering the transmission band with alteration rate corrected in accordance with the clock deviation.

16. The transmission apparatus according to claim 3, wherein the deviation detection unit calculates the clock deviation based on transmission data amount transmitted in a certain time period at nominal transmission rate of the client data and inputted data amount in a period in which the certain time period is counted based on the clock generated by the clock generation unit.

17. The transmission apparatus according to claim 3, further comprising a transmission band correction unit that corrects the transmission band of the client data in accordance with the difference between input rate and output rate of the client data.

18. The transmission apparatus according to claim 17, wherein the transmission band correction unit accumulates fraction less than one byte of the calculated value of transmission band after correction, and adds the sum to the transmission band.

19. The transmission apparatus according to claim 3, further comprising an instruction detection unit that detects alteration instruction for altering the transmission band of the client data;
- wherein the transmission band alteration unit alters the transmission band of the client data stepwise at each frame period of frames; and
- wherein the transmission apparatus further comprises a start time determination unit that determines the start time for altering the transmission band based on the detection time of the alteration instruction and length of the frame period.

20. The transmission apparatus according to claim 3, further comprising:
- an instruction detection unit that detects alteration instruction for altering the transmission band of the client data;

a delay detection unit that detects the amount of transmission delay of the alteration instruction; and a start time determination unit that determines the alteration start time for altering the transmission band based on the detection time of the alteration instruction and the amount of transmission delay.

* * * * *